United States Patent [19]
Salecker et al.

[11] Patent Number: 6,113,515
[45] Date of Patent: Sep. 5, 2000

[54] APPARATUS AND METHOD FOR CONTROLLING CREEP TORQUE IN A POWER TRAIN OF A MOTOR VEHICLE

[75] Inventors: Michael Salecker; Oliver Amendt; Thomas Jäger, all of Bühl, Germany

[73] Assignee: LuK Getriebe-Systeme GmbH, Buhl/Baden, Germany

[21] Appl. No.: 09/070,050

[22] Filed: Apr. 30, 1998

[30] Foreign Application Priority Data

Apr. 30, 1997 [DE] Germany ............................ 197 18 182

[51] Int. Cl.⁷ .................................................. B60K 41/28
[52] U.S. Cl. ............................. 477/72; 477/74; 477/76; 477/175; 192/82 T
[58] Field of Search ............................ 477/72, 74, 76, 477/171, 174–177; 192/3.55–3.57, 3.58, 3.61–3.63, 82 T

[56] References Cited

U.S. PATENT DOCUMENTS

| | | | |
|---|---|---|---|
| 4,072,220 | 2/1978 | Hamada | 477/174 |
| 4,618,042 | 10/1986 | Yamamoto | 477/74 |
| 5,020,645 | 6/1991 | Sasa | 192/3.63 X |
| 5,169,365 | 12/1992 | Friedmann . | |
| 5,217,412 | 6/1993 | Indlekofer et al. . | |
| 5,314,050 | 5/1994 | Slicker et al. | 477/171 |
| 5,377,796 | 1/1995 | Friedmann et al. . | |
| 5,409,091 | 4/1995 | Reik et al. . | |
| 5,450,934 | 9/1995 | Maucher . | |
| 5,632,706 | 5/1997 | Kremmling et al. | 477/74 |
| 5,700,227 | 12/1997 | Kosik et al. | 477/171 |
| 5,823,912 | 10/1998 | Fischer et al. | 477/97 |
| 5,916,061 | 6/1999 | Koyama et al. | 477/175 |
| 5,941,762 | 8/1999 | Amendt et al. | 477/74 |
| 5,989,153 | 11/1999 | Fischer et al. | 477/74 |
| 6,033,340 | 3/2000 | Amendt et al. | 477/77 |

*Primary Examiner*—Charles A Marmor
*Assistant Examiner*—Ankur Parekh
*Attorney, Agent, or Firm*—Darby & Darby

[57] ABSTRACT

The power train of a motor vehicle has an automated clutch and a control unit which causes one or more actuators to change the rate of torque transmission by the clutch from the engine to the transmission of the power train in response to appropriate signals from various sensors. When the transmission is shifted into gear while the engine is idling, while the brake or brakes are not applied and while the gas pedal is not depressed, the setting of the clutch is such that the transmission causes the motor vehicle to carry out a crawling movement as a result of a change of the rate of torque transmission by the clutch from the idling engine to the transmission from a first value (e.g., zero) to a second value as a function of the monitored temperature of the clutch.

61 Claims, 11 Drawing Sheets

APPARATUS AND METHOD FOR CONTROLLING CREEP TORQUE IN A POWER TRAIN OF A MOTOR VEHICLE

BACKGROUND OF THE INVENTION

The present invention relates to improvements in power trains for use in motor vehicles, and to improvements in methods of operating such power trains. More particularly, the invention relates to improvements in power trains of the type wherein a prime mover (such as an internal combustion engine or a motor) is arranged to transmit torque to a variable-speed transmission which, in turn, transmits torque to the driven wheels of the motor vehicle, and wherein an automated torque transmission system is installed between the prime mover and the transmission or downstream of the transmission to transmit a variable torque.

The torque transmission system (such as a friction clutch and hereinafter referred to as clutch for short) can be adjusted to transmit zero torque, to transmit a maximum torque, or to transmit a selected torque less than maximum torque. As a rule, the means for selecting the condition of the clutch comprises a signal receiving, processing and transmitting control unit and at least one so-called actuator which is responsive to signals from the control unit and directly or indirectly adjusts (i.e., selects the condition of) the clutch so that the latter can transmit torques of a desired magnitude. The control unit can receive signals from one or more sensors which are designed to monitor certain parameters of the prime mover, of the transmission, of the clutch, and/or of other constituents of the motor vehicle.

Power trains of the above outlined character are disclosed, for example, in commonly owned U.S. Pat. No. 5,176,234 granted Jan. 5, 1993 to Reik et al., in commonly owned U.S. Pat. No. 5,632,706 granted May 27, 1997 to Kremmling et al. for "MOTOR VEHICLE WITH ELECTRONIC CLUTCH MANAGEMENT SYSTEM", and in commonly owned U.S. Pat. No. 5,679,091 granted Oct. 21, 1997 to Salecker et al.

The disclosures of all U.S. patents and/or pending U.S. patent applications and/or foreign patents and/or foreign patent applications which are analyzed, otherwise discussed and/or merely mentioned in the specification of this application are incorporated herein by reference.

As a rule, motor vehicles of the type disclosed in the above enumerated patents comprise a prime mover in the form of a combustion engine or a hybrid system such as a combustion engine and an energy storing device and/or an electric motor. The clutch normally receives torque from a rotary output element of the prime mover (such as a camshaft or a crankshaft of an internal combustion engine), and the operation of such clutch is or can be automated; for example, the clutch can be adjusted (to a fully engaged, partly engaged or fully disengaged condition) by one or more actuators, e.g., by at least one actuator of the type having at least one electric motor or another driving component and a gearing, a fluid-operated system or a mechanical system for controlled transmission of motion from the driving component(s) to an adjustable part of the clutch. The actuator or actuators respond to signals from a normally electronic control unit which processes signals being transmitted thereto by one or more sensors and/or other signal generating means. The transmission can constitute a manually shiftable transmission which can be manipulated by the operator of the motor vehicle and is normally shiftable into neutral, into reverse gear and into any one of several forward gears. However, it is also possible to employ an automated or a fully automatic transmission or an infinitely variable transmission with adjustable pulleys or sheaves and an endless chain or belt which is trained over such adjustable parts. The transmission can operate with or without an interruption of pulling force.

A drawback of many presently known motor vehicles which embody the so-called electronic clutch management systems (known as ECM) is that their operation is not always predictable with a desired or required degree of accuracy. For example, if the vehicle is caused to creep or crawl (this normally involves a longer-lasting operation of a friction clutch with at least some slip between driving and driven parts), the friction linings (as well as certain other parts) of the clutch can become overheated as a result of a prolonged operation with slip, and this can entail a partial or complete destruction of the afflicted clutch.

Another drawback of presently known power trains of the above outlined character is that their operation is not fully predictable or not always predictable when the temperature of the clutch and/or of certain other component or components (such as the engine) of the power train varies within or beyond a certain range. For example, if a cold engine is to be started in a so-called cold start phase, the available engine torque and/or the idling RPM of the engine is higher than when the starting operation involves a heated or hot engine having a relatively low idling RPM. This entails that the motor vehicle is caused to creep or crawl at a higher speed or that the creeping or crawling movement is arrived at within a shorter interval than when the engine was cold prior to starting.

On the other hand, it is highly desirable and advantageous to ensure that the starting of a motor vehicle, as well as the stage or stages when the vehicle is caused or expected to creep, are fully predictable and reproducible with a very high degree of accuracy. This enables the operator of the motor vehicle to invariably operate the vehicle with a high degree of confidence and competence, not only for the purpose of enhancing the safety of but also for the purpose of enhancing the comfort to the occupant(s) of the vehicle. In other words, the operator of the motor vehicle should be in a position to accurately estimate the mode of operation of the vehicle, not only during travel at a permissible speed but also during starting, initial acceleration and/or crawling or creeping movement preceding the initial acceleration. Furthermore, it is equally desirable that the just discussed desirable characteristics of a motor vehicle during starting, during crawling and during initial acceleration remain at least substantially unchanged during the entire useful life of the vehicle, at least as long as the vehicle is adequately serviced at prescribed intervals.

Still further, at least certain presently known motor vehicles exhibit the drawback that the engine RPM decreases to and beneath an undesirably low value while the motor vehicle is caused to creep, i.e., while the engine furnishes an increasing creep torque. This, too, is undesirable under numerous circumstances of use of such conventional motor vehicles.

Other problems develop, or can develop, when a motor vehicle employing a presently known power train with an automated clutch and an engine which cooperates with the clutch and with a transmission to impart to the vehicle a creeping or crawling movement is braked while it performs a crawling movement. For example, it can happen that one or more brakes are being applied by the operator of the motor vehicle in the course of a crawling movement for the purpose of terminating such movement but the braking to a full stop is interrupted before the vehicle actually comes to a halt. Under such circumstances, the movement of the nearly arrested but still crawling vehicle is not sufficiently predictable or is not predictable at all.

OBJECTS OF THE INVENTION

An object of the invention is to provide a motor vehicle with a power train which is less affected by pronounced changes of the temperature of one or more component parts than heretofore known power trains.

Another object of the invention is to provide a power train which is constructed and assembled and operates in such a way that even a lengthy operation in a manner to induce a crawling or creeping movement of the motor vehicle does not promote a rapid or even any noticeable damage to or a destruction of the clutch.

A further object of the invention is to provide a novel and improved method of preventing rapid wear and/or other damage to the automated friction clutch in the power train of a motor vehicle as a result of extensive (such as frequent and/or long-lasting) creeping or crawling movements of the vehicle.

An additional object of the invention is to provide a power train whose construction and mode of operation are selected with a view to avoid, or at least greatly reduce, the adverse influence of heat developing when the selected movement of the motor vehicle amounts to a crawling or creeping movement.

Still another object of the invention is to provide a power train which does not affect the comfort of the occupant or occupants of a motor vehicle while the power train is caused to initiate or effect or maintain a crawling or creeping movement of the vehicle.

A further object of the invention is to provide a power train which ensures a predictable behavior of the motor vehicle during manipulation of the vehicle under circumstances which warrant or permit or necessitate slow or very slow movements amounting to or constituting a crawl or creeping motion.

Another object of the invention is to provide a relatively simple and inexpensive but reliable and wear-resistant (long lasting) power train which exhibits the above outlined advantages and can be utilized in many existing types or makes of motor vehicles.

An additional object of the invention is to provide a power train which is constructed and assembled and which can be operated in such a way that the RPM of its prime mover is not affected, or is not unduly affected, by an operation of the power train in a mode to induce a short or longer-lasting crawling or creeping movement of the motor vehicle.

Still another object of the invention is to provide a power train which is not unduly affected by abrupt changes of the creeping or crawling movements of the motor vehicle, for example, as a result of the application of one or more brakes for the purpose of reducing the speed of a crawling vehicle but not all the way to a full stop.

A further object of the invention is to provide a motor vehicle which embodies a power train exhibiting at least some of the above enumerated features and advantages.

Another object of the invention is to provide the power train with a novel and improved signal generating and transmitting arrangement for the control unit which determines, varies and otherwise influences the torque being transmitted by an automated torque transmission system (such as a clutch and/or a hydrokinetic torque converter) in the power train of a motor vehicle.

An additional object of the invention is to provide a novel and improved combination of signals which can be transmitted to and processed by the control unit to ensure that the automated torque transmission system will effect the operation of the motor vehicle in the aforeoutlined manner.

Still another object of the invention is to provide a method of operating a power train in such a way that the useful life of the power train, of its component parts and/or of the entire motor vehicle is not unduly affected by repeated lengthy or shorter operation of the power train in a manner to induce and maintain a creeping or crawling movements of the vehicle.

A further object of the invention is to provide a power train which constitutes an important improvement over and departure from heretofore known power trains and which can operate satisfactorily even if the crawling or creeping movements of the motor vehicle are caused to fluctuate within a wide range, for example, as a result of the application of one or more brakes to an extent which causes a slight or a pronounced reduction of the speed of the vehicle but does not entail a reduction of creep torque all the way to zero.

Another object of the invention is to provide a power train which ensures a comfortable ride to the occupant or occupants of the motor vehicle even if the crawling speed of the vehicle fluctuates within a wide range for reasons other than the application or termination or less pronounced application of one or more brakes, e.g., when the engine torque is varied as a result of activation or deactivation of one or more auxiliary aggregates such as an air conditioning system, a shifting from two-wheel drive to four-wheel drive or vice versa, or when the inclination of the wheel supporting surface changes while the vehicle is caused to creep therealong.

An additional object of the invention is to provide a novel and improved method of regulating the temperature of an automated friction clutch in the power train of a motor vehicle, particularly of counteracting a tendency of the clutch to overheat as a result of repeated and/or lengthy operation of the power train in a manner to induce a creeping or crawling movement of the motor vehicle.

Still another object of the invention is to provide a power train which can employ any one of a wide variety of torque transmission systems, transmissions and/or prime movers while exhibiting all or at least some of the above enumerated features, advantages and attributes.

A further object of the invention is to improve the presently available power trains in a manner to avoid the drawbacks which are exibited by available power trains and the remedies for which are not known to those familiar with the art of power trains for motor vehicles.

SUMMARY OF THE INVENTION

One feature of the present invention resides in the provision of a novel and improved power train for use in variable-speed motor vehicles of the type having at least one brake which can assume an applied or a non-applied condition or position.

The improved power train comprises an energy consuming prime mover (such as a fuel burning internal combustion engine) having inoperative and operative conditions (the latter includes an idling condition), means (such as a gas pedal in combination with a throttle valve) for supplying energy to the prime mover (such energy supplying means can assume an idle and an operative condition (the gas pedal is depressed in the operative condition of an energy supplying means which controls the admission of fuel into the cylinders of an internal combustion engine)), a manual or automated or automatic transmission which is shiftable into and from a plurality of gears, an automated variable-temperature torque transmitting system or transmission system connected with the prime mover and/or with the transmission (e.g., the torque transmitting system can be installed to transmit torque from an output element of the prime mover to an input element of the transmission), and means for operating the torque transmitting system. Such operating means includes a signal receiving, processing and transmitting control unit, at least one actuator serving to select the rate of torque transmission by the torque transmitting system in response to processed signals from the control unit, and means for transmitting signals to the control unit. Such signal transmitting means includes at least one sensor and/or other suitable means for (directly or indirectly) monitoring the temperature of the torque transmitting system. The control unit is arranged to transmit to the at least one actuator signals which initiate and effect a creeping or crawling movement of the motor vehicle by way of the power train when the transmission is in gear, when the prime mover assumes the operative condition in the non-applied condition of the at least one brake, in the inoperative condition of the energy supplying means and while the prime mover is idling, to thus induce the torque transmitting system to change—in response to shifting of the transmission into gear—the amount of torque transmission from at least one first value (e.g., zero) to at least one second value as a function of the monitored temperature of the torque transmitting system.

The torque transmitting system normally comprises a friction clutch but it can also comprise a hydrokinetic. torque converter or any other suitable adjustable or variable torque transmitting means. For the sake of simplicity and brevity, the torque transmitting system will be referred to as clutch or friction clutch.

The temperature monitoring means of the means for transmitting signals to the control unit can comprise at least one first sensor, and the signal transmitting means can further comprise one or more additional sensors and/or one or more electronic or other suitable circuits (for example, an electronic control circuit for the prime mover). The control circuit for the prime mover can be said to form part of , or can be set upon to form part of, the energy supplying means.

The at least one second value of the amount of torque transmission by the clutch under the aforedescribed circumstances can constitute a maximum value of torque transmission while the motor vehicle is caused to carry out a crawling movement.

The transmission renders it possible to drive the motor vehicle at a plurality of different speeds, and the prime mover is normally arranged to transmit a variable torque. The rate of change of torque transmission from the first value to the second value can be regulated as a function of the temperature of the clutch as well as a function of at least one of (a) the speed of the motor vehicle, (b) the magnitude of the torque being transmitted by the prime mover, (c) a preselectable value (constant), and (d) at least one vehicle parameter other than the speed of the vehicle.

As already mentioned above, the at least one value of the amount of torque transmission by the clutch can equal zero or can be close to zero.

If the torque transmitting system is a friction clutch, such clutch has engaged and disengaged conditions and an engagement point at which the transmission of torque begins. The aforementioned at least one first value of the amount of torque transmission by such clutch can correspond to the rate of torque transmission at the engagement point.

It is also possible to select the at least one first value of the amount of torque transmission by the clutch in such a way that it corresponds to a value of torque transmission prior to initiation of crawling movement of the motor vehicle by way of the improved power train.

Still further, the clutch can be arranged to change the amount of torque transmission from the at least one first value to a plurality of second values including a maximum value in accordance with the equation $$M_{creep} \text{ or } M_{creep,max} = \underline{a} + \underline{b} * T_K$$

wherein $M_{creep}$ is one of the plurality of second values, $M_{creep,max}$ is the maximum value, $\underline{a}$ and $\underline{b}$ are summands and factors, and $T_K$ is the temperature of the clutch.

Alternatively, if the clutch is arranged to change the amount of torque transmission from the at least one first value to a plurality of second values including a maximum value, and if the temperature of the clutch is variable within a range of temperatures, the clutch can be set up to vary the amount of torque transmission within the aforementioned range of temperatures as at least one function of the temperature in accordance with the equation $$M_{creep} \text{ or } M_{creep,max} = f(T_K, \ldots)$$

wherein $M_{creep}$ is one of the plurality of second values, $M_{creep,max}$ is the maximum value, and $T_K$ is the temperature of the clutch.

The at least one function can constitute a linear function. Alternatively, the at least one function can constitute a non-linear function (such as an exponential, square or stepped function). The arrangement can be such that the clutch reduces the second value of the amount of torque transmission in response to a drop of monitored temperature of the clutch. Alternatively, the clutch can be caused to reduce the second value of the amount of torque transmission in response to an increase of monitored temperature of the clutch.

If the control unit is set up to cause the clutch to change the amount of torque transmission from the at least one first value to a plurality of second values, and if the temperature of the clutch is normally variable within a range of temperatures including at least one threshold value which divides the range of temperatures into a plurality of narrower ranges or temperature windows, the second values of the amount of torque transmission within at least one of these windows can be independent of the monitored temperature of the clutch.

The temperature windows can include a first window and a second window; the first window can include a maximum value of the clutch temperature and at least one second value of the amount of torque transmission within the first window can be independent of the monitored temperature of the clutch.

The windows can further include a third window; the second values of the amount of torque transmission within the second window can be a function of the monitored temperature of the clutch, and the second values of the amount of torque transmission within the third window can be independent of the monitored temperature of the clutch. Under such circumstances, the second values of the amount of torque transmission within the third window can be at least close to zero, and the first window then encompasses clutch temperatures lower than those encompassed by the second and/or third window.

At least in many instances, the temperatures within the first window are lower than those within the second window.

The arrangement can be such that the amount of torque transmission by the clutch decreases within the second window as a function of changes of the monitored temperature of the clutch.

Furthermore, the clutch can be set up to vary the amount of torque transmission within the first window as a linear function of the monitored temperature of the clutch. Alternatively, the control unit can cause the clutch to vary the amount of torque transmission within the first window as a non-linear function of the monitored temperature of the clutch. For example, the non-linear function can be an exponential, a square or a stepped function.

As already mentioned hereinbefore, the means for monitoring the temperature of the clutch can include at least one sensor which is set up to directly monitor such temperature. Alternatively, the temperature monitoring means can be set up to indirectly monitor the temperature of the clutch. If the clutch is an engageable and disengageable friction clutch having rotary driving and driven components which are in frictional sliding engagement with each other in each of a plurality of partly engaged conditions of the clutch with attendant generation of heat, the control unit can be equipped with or can embody means for calculating the temperature of the clutch on the basis of the quantity of generated heat. The thermal capacity of the clutch also influences such calculation of its temperature. The driving component or components of a friction clutch can include at least one flywheel which receives torque from the prime mover, e.g., from a camshaft or a crankshaft of an internal combustion engine.

The amount of torque transmission by the clutch can further depend from at least one of a plurality of parameters including (a) the speed of the motor vehicle, (b) the torque being transmitted by the prime mover while the vehicle is in motion, (c) the idling torque of the prime mover, (d) a difference between the torques being transmitted by the prime mover during different stages of operation of the motor vehicle, (e) the RPM of a rotary component of the prime mover while the vehicle is in motion, (f) the RPM of a rotary component of the prime mover while the latter is idling, (g) the RPM of a rotary component of the transmission, (h) the difference between the RPMs of the rotary components of the prime mover and the transmission, and (i) time.

If the clutch is an engageable and disengageable friction clutch so that the amount of torque transmission is dependent upon the extent of engagement of the clutch by the at least one actuator, the amount of torque transmission normally increases in response to increasing engagement and decreases in response to decreasing engagement of the clutch. At least one of the just mentioned increase and decrease of the clutch torque can be caused to vary as a function of time, at least within a portion of the duration of the increase and/or decrease of the torque being transmitted by the clutch.

Alternatively, the increase and/or decrease of the torque being transmitted by the clutch can vary within at least two intervals of time in accordance with at least two different functions of time. For example, the amount of torque transmission can increase from a value at least close to zero to a preselected value within one of the two intervals and to depart from the preselected value within the other of these intervals. Alternatively, the amount of torque transmission can decrease from a first predetermined value to a second predetermined value within one of the at least two intervals of time, and from the second predetermined value at least close to zero within another of the at least two intervals.

If the clutch is a friction clutch which is arranged to increase the amount of torque transmission in response to increasing engagement and to decrease the amount of torque transmission in response to decreasing engagement between its driven and driving parts, the extent of the increase and/or decrease of the extent of clutch engagement can vary within at least two intervals of time as a function of at least one of the aforementioned plural parameters including the speed of the motor vehicle, the torque of the prime mover in the idling condition of the prime mover, the RPM of a rotary component of the prime mover in an operative condition other than idling, the RPM of a rotary component of the prime mover during idling, and time.

The extent of the aforementioned increase or decrease can increase in response to an increase of the RPM of the rotary component of the prime mover during idling in accordance with a linear function or a non-linear function of at least one of the above-enumerated parameters. For example, a non-linear function can constitute an exponentional, a square or a stepped function.

Furthermore, the extent of the aforementioned increase and/or decrease can rise as a function of the RPM of the rotary component of the prime mover during idling in such a way that the extent of increase and/or decrease rises at a lower rate in response to increasing RPM of such rotary component of the prime mover during idling.

Alternatively, in lieu of the extent, the rate at which the extent of the increase or decrease of torque transmission by the clutch varies can be a function of at least one of the aforementioned plurality of parameters including the speed of the motor vehicle, the torque of the prime mover in the idling condition, the RPM of a rotary component of the prime mover in an operative condition other than idling, the RPM of a rotary component of the prime mover during idling, and time. Again, the rate of the increase and/or decrease of the amount of torque transmission by the clutch can increase as a function of the RPM of a rotary component of the prime mover during idling in such a way that the amount will increase at a lower rate in response to increasing RPM of the rotary component of the prime mover during idling.

The amount can increase in response to an increase of the RPM of the rotary component of the prime mover during idling in accordance with a linear function or a non-linear function of at least one of the aforementioned plurality of parameters, and the non-linear functions can include an exponential, a square or a stepped function.

The rate of the increase and/or decrease of torque being transmitted by the friction clutch can rise as a function of variations of the RPM of a component of the prime mover during idling so that this rate rises in response to a rise of such RPM. The rise can be one in accordance with a linear or a non-linear function of at least one of the aforementioned parameters and, again, the non-linear function can be or is one of exponential, square and stepped functions.

The rate of the increase can be regulated to raise the crawling torque and/or the rate of rise of crawling torque as a function of the difference between the actual idling RPM of a component of the prime mover and the idling RPM of such component while the prime mover is heated. Such increase can be regulated to raise the crawling torque and/or the rate of rise of crawling torque at a lower rate in response to increasing difference between the actual idling RPM and the idling RPM while the prime mover is heated. The raise at the lower rate is or can be effected in accordance with a linear or non-linear function of at least one of the aforementioned parameters. Furthermore, the raise of crawling torque can be inversely proportional to the difference between the actual RPM and the idling RPM while the prime mover is heated.

Another feature of the invention resides in the provision of a power train for use in a variable-speed motor vehicle having at least one brake adapted to assume applied and non-applied conditions. The power train comprises an energy consuming prime mover which can transmit torques of different magnitudes and has inoperative and operative conditions including an idling condition, means for supplying energy to the prime mover (such energy supplying means has idle and operative conditions), a transmission which is shiftable into and from a plurality of different gears, an automated variable-temperature torque transmitting system (e.g., a clutch) connected with the prime mover and/or with the transmission, and means for operating the clutch. The operating means includes a signal receiving, processing and transmitting control unit, at least one actuator serving to select the amount of torque transmission by the clutch in response to signals from the control unit, and means for transmitting signals to the control unit including means for monitoring the temperature of the clutch, means for monitoring a first parameter including the speed of the motor vehicle, means for monitoring the magnitude of the torque being transmitted by the prime mover, and means for monitoring at least one further parameter of the motor vehicle. The control unit is designed to transmit to the at least one actuator signals which initiate and effect a crawling movement of the motor vehicle by way of the power train when the transmission is in gear, the prime mover assumes its operative condition in the non-applied condition of the at least one brake, in the inoperative condition of the energy supplying means and while the prime mover is idling to thus induce the clutch to change the amount of torque transmission from at least one first value to at least one second value as a function of at least one of (a) at least one of the monitored parameters, (b) the monitored magnitude of the torque being transmitted by the prime mover, and (c) a preselectable value. The amount of torque transmission by the clutch includes a maximum rate which is a function of the monitored temperature of the clutch.

A further feature of the invention resides in the provision of a power train for use in a motor vehicle having at least one brake which can assume applied and non-applied conditions. The power train comprises and energy-consuming variable-RPM prime mover having inoperative and operative conditions including an idling condition, means for supplying energy to the prime mover (such energy supplying means has idle and operative conditions), a transmission which is shiftable into and from a plurality of gears, an automated torque transmitting system (such as a friction clutch) connected with the prime mover and/or with the transmission, and means for operating the clutch. Such operating means comprises a signal receiving, processing and transmitting control unit, at least one actuator arranged to select the amount of torque transmission by the clutch in response to signals from the control unit, and means for transmitting signals to the control unit. The control unit can transmit to the at least one actuator signals which effect a crawling movement of the motor vehicle by way of the power train when the transmission is in gear, the prime mover assumes its operative condition in the non-applied condition of the at least one brake, in the inoperative condition of the energy supplying means and while the prime mover is idling to thus induce the clutch to change the amount of torque transmission from at least one first value to at least one second value. The signal transmitting means includes means for monitoring the RPM of the prime mover at least while the motor vehicle is crawling, and the control unit is arranged to increase the at least one first value while the RPM of the prime mover is above a predetermined threshold value.

An additional feature of the instant invention resides in the provision of a power train for use in a motor vehicle having at least one brake adapted to assume applied and non-applied conditions. The power train comprises an energy-consuming variable-RPM prime mover having inoperative and operative conditions including an idling condition, means for supplying energy to the prime mover (such energy supplying means can assume an idle condition or an operative condition), a transmission which is shiftable into and from a plurality of gears, an automated torque transmitting system (such as a friction clutch) connected with the prime mover and/or with the transmission, and means for operating the clutch. Such operating means comprises a signal receiving, processing and transmitting control unit, at least one actuator serving to select the rate of torque transmission by the clutch in response to signals from the control unit, and means for transmitting signals to the control unit. The control unit is set up to transmit to the at least one actuator signals which effect a crawling movement of the motor vehicle by way of the power train when the transmission is in gear, the prime mover assumes its operative condition in the non-applied condition of the at least one brake, in the inoperative condition of the energy supplying means, and while the prime mover is idling to thus induce the clutch to change the amount of torque transmission from at least one first value to at least one second value. The signal transmitting means comprises means for monitoring the RPM of the prime mover at least while the motor vehicle is crawling, and the control unit is arranged to increase the at least one first value while the RPM of the prime mover is above a first threshold value and to at least slightly reduce the amount of torque transmission when the RPM of the prime mover decreases below a second threshold value.

The RPM of the prime mover in the idling condition of the prime mover can exceed the first threshold value by a predetermined amount or value, and the first threshold value can exceed the second threshold value. The control unit is or can be arranged to increase the amount of torque transmission by the clutch in response to a change of the RPM of the prime mover from the second threshold value to a third threshold value. The RPM of the prime mover in the idling condition of the prime mover can exceed the third threshold value by a amount, and the third threshold value can exceed the second threshold value. The third threshold value can at least approximate the first threshold value.

Another feature of the invention resides in the provision of a power train for use in a motor vehicle having at least one brake arranged to assume applied and non-applied conditions. The power train comprises an energy-consuming prime mover having inoperative and operative conditions including an idling condition, means for supplying energy to the prime mover (such energy supplying means can be caused to assume an idle condition and an operative condition), a transmission which is shiftable into and from a plurality of gears, an automated torque transmitting system (such as a friction clutch) connected with the prime mover and/or with the transmission, and means for operating the clutch. The operating means comprises a signal receiving, processing and transmitting control unit, at least one actuator serving to select the amount of torque transmission by the clutch in response to signals from the control unit, and means for transmitting signals to the control unit. The control unit is arranged to transmit to the at least one actuator signals which effect a crawling movement of the motor vehicle by way of the power train when the transmission is in gear, the prime mover assumes its operative condition in the non-applied condition of the at least one brake, in the inoperative condition of the energy supplying means and while the prime mover is idling to to thus induce the clutch to change (in response to shifting of the transmission into gear) the amount of torque transmission from at least one first value to at least one second value within a predetermined period of time.

The second value can correspond to a amount of torque transmission at which the motor vehicle begins to carry out its crawling movement.

An additional feature of the invention resides in the provision of a power train for use in a motor vehicle having at least one brake arranged to assume applied and non-applied conditions. The improved power train comprises an energy consuming prime mover having inoperative and operative conditions, means for supplying energy to the prime mover (such energy supplying means can assume an idle condition or an operative condition), a transmission which is shiftable into and from a plurality of gears, an automated torque transmitting system (such as a friction clutch) connected to the prime mover and/or with the transmission, and means for operating the clutch. Such operating means comprises a signal receiving, processing and transmitting control unit, at least one actuator serving to select the amount of torque transmission by the clutch in response to signals from the control unit, and means for transmitting signals to the control unit. The control unit is adapted to transmit to the at least one actuator signals which effect a starting movement of the vehicle by way of the power train when the transmission is in gear, when the prime mover assumes its operative condition in the non-applied condition of the at least one brake, in the operative condition of the energy supplying means and while the prime mover is in the operative condition to thus induce the clutch to change (in response to shifting of the transmission into gear) the amount of torque transmission from at least one first value to at least one second value at which second value the motor vehicle is set in motion within a predetermined interval of time.

Another feature of the invention resides in the provision of a power train for use in a motor vehicle having at least one brake adapted to assume applied and non-applied conditions. The power train comprises a prime mover having inoperative and operative conditions, means for supplying energy to the prime mover (such energy supplying means can assume an idle condition or an operative condition), a transmission which is shiftable into a plurality of gears, an automated torque transmitting system (such as a friction clutch) connected with the prime mover and/or with the transmission, and means for operating the clutch. The operating means comprises a signal receiving, processing and transmitting control unit, at least one actuator serving to select the amount of torque transmission by the clutch in response to signals from the control unit, and means for transmitting signals to the control unit. The latter is adapted to transmit to the at least one actuator signals which effect a crawling movement of the motor vehicle by way of the power train when the transmission is in gear, the prime mover assumes its operative condition in the non-applied condition of the at least one brake, in the inoperative condition of the energy supplying means and while the prime mover is idling to thus induce the clutch to change (in response to shifting of the transmission into gear) the amount of torque transmission from at least one first value to at least one second value at which second value the motor vehicle proceeds to carry out a crawling movement until the application of the at least one brake. This entails a reduction of the at least one second value as a function of time, and the control unit is further adapted to set the amount of torque transmission at a predetermined third value in response to a termination of the application of the at least one brake before the rate of torque transmission by the clutch is reduced all the way to zero.

A further feature of the invention resides in the provision of a power train for use in a motor vehicle wherein the control unit is arranged to transmit to the at least one actuator signals which effect a crawling movement of the vehicle by way of the power train when the transmission is in gear, the prime mover assumes the operative condition in the non-applied condition of the at least one brake and in the inoperative condition of the energy supplying means to thus induce the clutch to change (in response to shifting of the transmission into gear) the amount of torque transmission from at least one first value to at least one second value at which the motor vehicle proceeds to carry out its crawling movement until the application of the at least one brake. This entails a reduction of the amount of torque transmission of the clutch from the at least one second value as a function of time. The control unit can set the amount of torque transmission back to the second value in response to a termination of the application of the at least one brake prior to a reduction of the amount of torque transmission of the clutch to zero.

Another feature of the invention resides in the provision of a power train wherein the control unit is adapted to transmit to the at least one actuator signals which effect a crawling movement of the motor vehicle by way of the power train when the transmission is in gear, the prime mover assumes its operative condition in the non-applied condition of the at least one brake and in the inoperative condition of the energy supplying means to thus induce the clutch to change (in response to shifting of the transmission into gear) the amount of torque transmission from at least one first value to at least one second value at which second value the motor vehicle proceeds to carry out the crawling movement until the application of the at least one brake. This entails a reduction of the at least one second value toward zero, and the control unit is arranged to change the amount of torque transmission to a maximum permissible third value in response to a termination of application of the at least one brake prior to a reduction of the at least one second value all the way to zero.

The third value can exceed the at least one second value.

Still another feature of the invention resides in the provision of several methods of operating a power train in a motor vehicle having at least one brake arranged to assume applied and non-applied conditions. One embodiment of the power train which can be utilized for the practice of the improved method comprises an energy consuming prime mover (e.g., an internal combustion engine) having inoperative and operative conditions including an idling condition, means for supplying energy to the prime mover (such energy supplying means has idle and operative conditions), a transmission (e.g., a manual or automated or automatic transmission) which is shiftable into and from a plurality of gears, an automated variable-temperature torque transmitting system (such as a clutch or a hydrokinetic torque converter with or without a lockup clutch) connected with the prime mover and/or with the transmission, and means for operating the torque transmitting system including a signal receiving, processing and transmitting control unit, at least one actuator arranged to select the amount of torque transmission by the torque transmitting system in response to signals from the control unit, and means for transmitting signals to the control unit including means for monitoring the temperature of the torque transmitting system.

One of several presently preferred methods comprises the steps of shifting the transmission in gear, causing the prime mover to assume the operative condition, maintaining the at least one brake in the non-applied condition, causing the energy supplying means to assume the inoperative condition, and - as a result of shifting the transmission into gear - causing the control unit to transmit to the at least one actuator signals which effect a crawling movement of the motor vehicle by way of the power train to thus induce the torque transmitting system to change the amount of torque transmission from at least one first value to at least one second value as a function of monitored temperature of the torque transmitting system.

Certain other methods of the present invention can include the aforediscussed steps of applying the at least one brake to thus reduce the at least one second value of the amount of torque transmission, and terminating the application of the at least one brake before the amount of torque transmission is reduced all the way to zero (e.g., as a result of complete stoppage of the motor vehicle).

Each of the aforediscussed embodiments of the improved power train can be utilized for the practice of at least one method in accordance with the present invention. For example, and as already explained hereinbefore, the method or methods of the present invention can involve the regulation of torque to be transmitted by a friction clutch or another suitable torque transmitting system in dependency on one or more variables other than (and/or in addition to) the temperature of the torque transmitting system.

Furthermore, the control unit which determines the steps of the improved methods can receive signals from a host of various sensors and/or electronic circuits which monitor the prime mover, the transmission, the at least one brake, the energy supplying means and/or other constituents of the power train.

The novel features which are considered as characteristic of the invention are set forth in particular in the appended claims. The improved power train itself, however, both as to its construction and its mode of operation, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
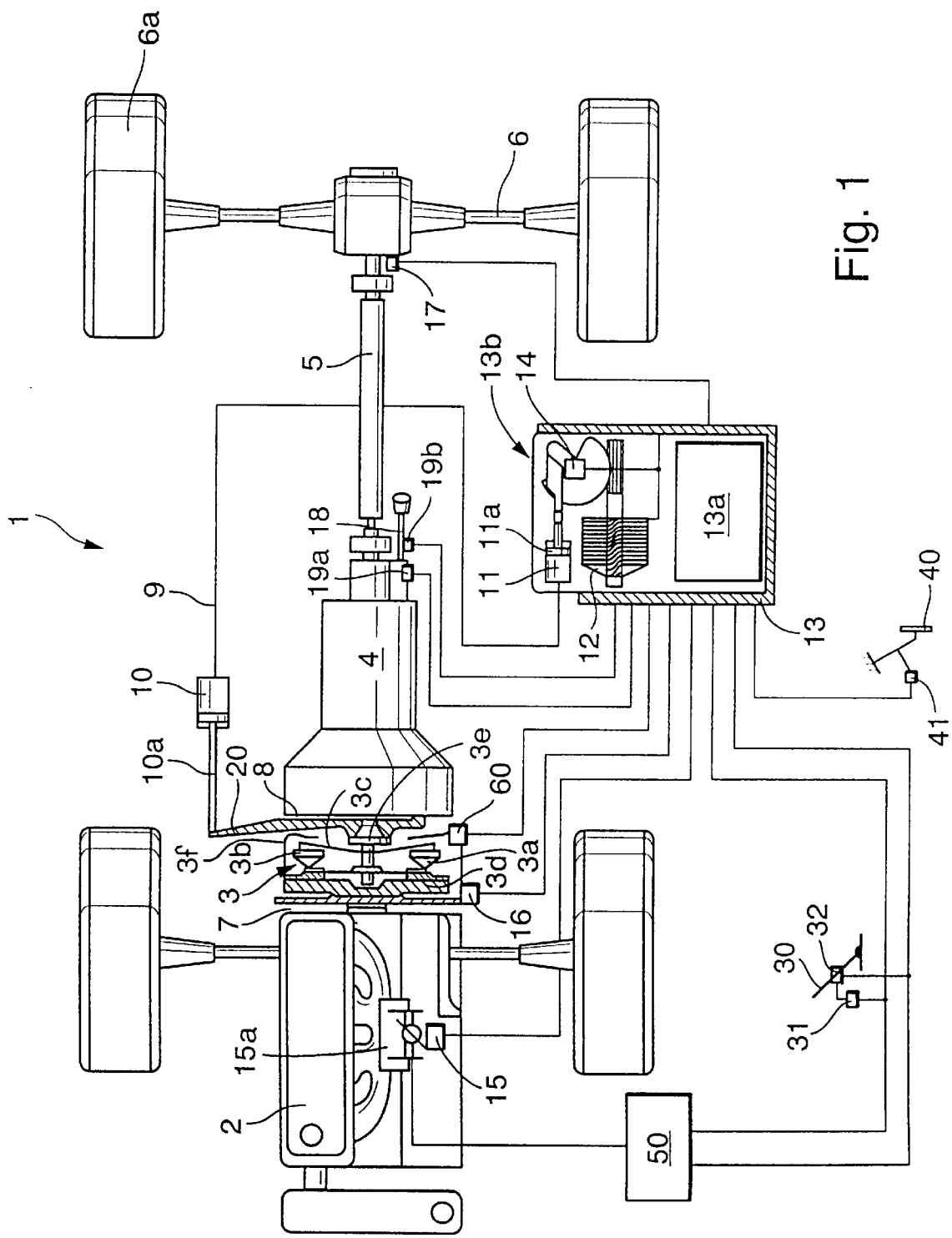
FIG. 1 is a schematic partially plan and partially sectional view of a motor vehicle including a power train which embodies the present invention and employs an automated torque transmitting system.

FIG. 1 is a schematic view of certain parts of a motor vehicle 1 wherein the power train comprises a prime mover 2 (such as a standard internal combustion engine or another motor), an automated torque transmission or torque transmitting system 3 (shown in the form of a friction clutch) which can receive torque directly from an output element (such as a camshaft or a crankshaft) of the prime mover 2 (hereinafter called engine or combustion engine), and a manually shiftable change-speed transmission 4 having a rotary input element (e.g., a shaft) arranged to receive torque from a rotary output element (clutch disc or clutch plate) 3a of the clutch 3 and having a rotary output element 5 arranged to drive a differential for the axles 6 of driven wheels 6a.

The clutch 3 need not necessarily operate in the power flow between the engine 2 and the transmission 4; it is also possible to install the clutch downstream of an automated or automatic transmission. Furthermore, the clutch 3 need not be a friction clutch but can constitute any other suitable torque transmitting system such as a dry friction clutch, a multiple-disc clutch, a magnetic powder clutch, or a lockup clutch (also called bypass clutch) of the type normally employed in or with hydro-kinetic torque converters. Reference may be had, for example, to commonly owned U.S. Pat. No. 5,377,796 granted Jan. 3, 1995 to Friedmann et al. for "APPARATUS FOR TRANSMITTING FORCE BETWEEN ROTARY DRIVING AND DRIVEN UNITS" which shows a hydrokinetic torque converter with a lockup clutch operating between a prime mover and a transmission. Still further, the clutch can be a self adjusting clutch of the type disclosed, for example, in commonly owned U.S. Pat. No. 5,409,091 granted Apr. 25, 1995 to Reik et al. for "AUTOMATICALLY ADJUSTABLE FRICTION CLUTCH", or in commonly owned U.S. Pat. No. 5,450,934 granted Sep. 19, 1995 to Maucher for "FRICTION CLUTCH". Such clutches are designed to automatically compensate for wear upon the friction linings of the clutch disc and (if necessary) for wear upon certain other parts of the clutch.

It is further possible to replace the illustrated friction clutch 3 with a so-called starter clutch, a safety clutch with a planned torque transmission, or a direction reversing clutch of the type disclosed, for example, in commonly owned U.S. Pat. No. 5,169,365 granted Dec. 8, 1992 to Friedmann for "POWER TRAIN", or in commonly owned U.S. Pat. No. 5,217,412 granted Jun. 8, 1993 to Indlekofer et al. for "CONTINUOUSLY VARIABLE SPEED TRANSMISSION". Moreover, the illustrated clutch 3 can be replaced with a clutch which is designed to transmit a desired torque with an extremely high degree of accuracy and reproducibility, with a so-called dry friction clutch, with a wet friction clutch at least certain components of which are immersed or confined in a body of liquid, or with a hydrokinetic torque converter (e.g., of the type disclosed in the aforementioned '796 patent to Friedmann et al.).

The illustrated manually shiftable variable-speed transmission 4 is assumed to constitute a multiple-speed transmission with a given number of gear ratios. However, such transmission can be replaced with an automated transmission which is automatically shiftable into and from selected gears by one or more actuators and which can be shifted into a finite or infinite number of different gears. The automated transmission can be of the type which interrupts the power flow during automatic shifting (by one or more actuators) into a selected gear.

Still further, the manual transmission 4 can be replaced with a fully automatic transmission which can be shifted (e.g., by means of one or more actuators) into selected gears basically without an interruption of power flow. Such automatic transmissions normally employ suitable planetary gearings. Still further, the transmission in the power train of FIG. 1 can be an infinitely variable transmission with adjustable pulleys of the type disclosed, for example, in the aforementioned '365 patent to Friedmann or in the aforementioned '412 patent to Indlekofer et al. Each of the selected transmissions can be designed to shift into and from a plurality of gears, e.g., a neutral gear, a reverse gear and several forward gears.

The friction clutch 3 of FIG. 1 comprises an input side 7 which receives torque from the engine 2, and an output side 8 (including the aforementioned clutch disc or clutch plate 3a) which can transmit selected torque (including zero torque) to the input element of the transmission 4. The clutch disc 3a can be clamped between a flywheel or counterpressure plate 3d at the input side 7 and an axially movable pressure plate 3b when the clutch 3 is at least partially engaged. The pressure plate 3b is biased by a clutch spring 3c (such as a diaphragm spring) which rotates with a clutch housing 3f receiving torque from the flywheel 3d and further serving to non-rotatably but axially movably confine the clutch plate 3b.

The means for changing the condition (i.e., the extent of engagement or disengagement) of the automated friction clutch 3 comprises an axially movable bearing 3e which can engage the radially inwardly extending tongues or prongs of the diaphragm spring 3c to tilt the spring 3c relative to a seat in the housing 3f. Reference may be had to the aforementioned '091 patent to Reik et al. and/or to the aforementioned '934 patent to Maucher. The illustrated push-type clutch 3 can be replaced with a so-called pull-type clutch wherein the prongs or tongues of the clutch spring must be pulled in order to change the extent of engagement of the clutch.

The means for operating the clutch 3, i.e., for selecting the magnitude of the torque which the flywheel 3d can transmit to the input element of the transmission 4 by way of the clutch disc 3a, comprises an electronic signal receiving, processing or evaluating and transmitting control unit 13, an actuator 13b which responds to the signals from the control unit 13, and a hydro-mechanical connection 9, 10, 10a, 11, 11a, 20 between the actuator 13b and the bearing 3e. The electronic circuit of the control unit 13 is shown at 13a, and this circuit transmits signals to an electric motor 12 of the actuator 13b. The motor 12 can transmit motion to a spur, bevel, worm or crank gearing or a feed screw forming part of the actuator 13b and connected with the reciprocable input element (piston) 11a of a hydraulic or pneumatic (e.g., hydraulic) master cylinder 11 connected to a slave cylinder 10 by a hydraulic conduit 9 of the aforementioned connection 9, 10, 10a, 11, 11a, 20. The piston rod 10a of the slave cylinder 10 is operatively connected with a pivotable and/or otherwise movable fork 20 which can change the axial position of the bearing 3a for the prongs of the clutch spring 3c. Additional motion transmitting means (e.g., a linkage or the like) can be provided between the illustrated gearing of the actuator 13b and the piston 11a of the master cylinder 11.

The common housing or casing 13c for the circuit 13a of the control unit 13 and the motor 12 of the actuator 13b can be replaced with two discrete housings or casings.

The circuit 13a can comprise the regulating and the power components for the electric motor 12 of the actuator 13b. An advantage of the illustrated combination of control unit 13 and actuator 13b in a common housing or casing 13c is that the space requirements of such parts of the means for operating the automated clutch 3 are reduced accordingly as well as that such parts can be assembled into a module at the mnufacturing plant.

The means for transmitting signals to the input or inputs of the circuit 13a forming part of the control unit 13 comprises a plurality of sensors including a sensor 14 which monitors the positions, the orientation, the speed and/or the stressing of at least one mobile part of the actuator 13b to thus indicate the axial position of the bearing 3e, i.e., the extent of engagement of (the magnitude of the torque being transmitted by) the clutch 3. The sensor 14, or an additional or equivalent sensor (not shown), can be employed to directly monitor one or more parameters of the bearing 3e and/or of the fork 20 (or an equivalent part, such as a central engaging/disengaging member) and/or of the piston rod 10a of the slave cylinder 10 to thus ascertain and signalize (to the circuit 13a) the interesting characteristics (such as the speed or the acceleration or the extent of engagement, including full engagement and complete disengagement) of the clutch 3.

The electric motor 12 can be replaced by or utilized jointly with a fluid-operated (hydraulic or pneumatic) motor for the gearing of the actuator 13b. For example, the motor 12 can receive signals from the electronic circuit 13a to operate a hydraulic or pneumatic cylinder and piston assembly which, in turn, can operate the gearing of the actuator 13b. Still further, it is possible to utilize an actuator which employs one or more permanent magnets or electromagnets to establish a motion transmitting connection between the preferably electronic circuit 13a of the control unit 13 and the axially movable bearing 3e of the automated clutch 3. The bearing 3e cooperates with the clutch spring 3c to move the pressure plate 3b between two end positions (corresponding to the fully engaged and fully disengaged conditions of the clutch 3) and a preferably infinite number of intermediate positions (each corresponding to a different partly engaged condition of the clutch). The clutch disc 3c is provided with customary friction linings which are engageable in a controlled manner (with or without slip) by the adjacent friction surfaces of the flywheel 3d and the pressure plate 3b. Reference may be had again to the aforementioned '091 patent to Reik et al. and/or to the aforementioned '934 patent to Maucher.

The arrangement is or can be such that, when the control unit 13 causes the bearing 3e to assume one or more intermediate positions, the magnitude of the momentarily applied engine torque (such torque is being applied by the flywheel 3d) exceeds the magnitude of the torque which the clutch disc 3c transmits to the input element of the transmission 4. The control unit 13 and the associated actuator 13b are preferably designed to maintain the clutch 3 in a selected condition (for the transmission of a selected torque to the transmission 4) for desired (shorter or longer) intervals of time.

Still further, the clutch 3 can be designed or set up to transmit (when necessary) torques of a magnitude exceeding that which can be transmitted to the flywheel 3d. This is desirable when the clutch 3 is to serve as a means for absorbing any peaks of torque being transmitted by the engine 2, namely excessive torque which, if transmitted by the power train all the way to the wheels 6a, could affect the comfort of the occupant or occupants of the motor vehicle.

The sensor 14 is but one of several sensors which are normally provided to transmit signals to the circuit 13a of the control unit 13, either continuously or at selected (regular or irregular) intervals. Such signals are processed by the circuit 13a, and the processed signals enable the actuator 13b to accurately and reproducibly regulate the magnitude of the torque which the clutch 3 transmits between the engine 2 and the transmission 4. The additional sensors can be designed and set up to monitor all or the majority of relevant parameters of the constituents of the improved power train or the entire motor vehicle 1.

The signals from the sensor 14 and/or other sensors can be transmitted to the circuit 13a of the control unit 13 as well as to one or more additional electronic or other circuits in the motor vehicle 1. FIG. 1 shows an electronic engine circuit 50. It is possible to employ one or more additional electronic circuits which transmit signals to and/or receive signals from the circuit 50 and/or 13a. Such additional circuit or circuits can include an electronic circuit of a conventional antiblocking system (ABS) and/or a conventional antislip regulator (ASR). The circuit 50 (and the additional circuit or circuits) can receive signals from and preferably also transmit signals to the circuit 13a of the control unit 13. The means for transmitting signals between the circuit 13a on the one hand, and the circuit 50 and several sensors (such as 14 to 17, 19a, 19b, 31, 32, 41) on the other hand, further comprises several conductors including one or more buses. For example, a bus (e.g., a CAN bus) can be provided between the circuits 13a and 50. The signals can denote the RPM of the wheels 6a, the position of the gear selecting/shifting member (lever) 18 of the transmission 4, the position of the pivotable flap of the throttle valve 15a, the engine RPM, the momentary gear of the transmission 4, the intention or lack of intention of the operator of the motor vehicle to shift the transmission into a different gear, and/or other vehicle parameters.

A sensor 15 is provided to transmit (via suitable electric conductor means) signals denoting or determining the angular position and/or other parameters of the pivotable flap forming part of the customary throttle valve 15a for the engine 2. This sensor is connected with the circuits 13a and 50.

A further sensor 16 is designed to monitor the RPM of the rotary output element of the engine 2 (e.g., by monitoring the RPM of the flywheel 3d) and is connected to the circuit 13a.

Another sensor 17 is connected with the circuit 13a to transmit signals denoting the RPM of a rotary part of the differential which receives torque from the output element 5 of the transmission 4; this sensor 17 can serve to furnish signals denoting the RPM of the wheels 6a and hence the speed of the motor vehicle 1.

The circuit 13a (e.g., a microprocessor) processes some or all of the incoming signals and transmits appropriate signals to the motor 12 of the actuator 13a and (if and when necessary) to additional signal-responsive components of the motor vehicle 1.

The transmission 4 of FIG. 1 is a stepwise variable transmission which is provided with the aforementioned gear selecting/shifting member (lever) 18. Such member is manipulated by the operator of the motor vehicle 1, and the transmission 4 can be shiftable, for example, into neutral gear, into reverse gear, and into say three, four or five different forward gears. A sensor 19b is installed to transmit to the electronic circuit 13a signals which denote the actual positions of the member 18 (i.e., the momentary gear of the transmission 4) and/or the presence or absence of an intention on the part of the driver or operator of the motor vehicle to shift the transmission out of or into a particular gear. The sensor 19b can cooperate with or transmit signals independently of a further sensor 19a. For example, the sensor 19a can monitor the position(s), the speed, the acceleration and/or the magnitude of forces being applied to one or more internal parts of the transmission 4 for the purpose of generating signals which denote the momentary position of the member 18 (i.e., the momentary gear of the transmission) and/or the presence or absence of an intent to shift the transmission into or from a particular gear. As already mentioned above, the sensor 19a and/or 19b can determine the existence or the absence of an intent to shift the transmission 4 into or from a particular gear by monitoring the magnitude of the force(s) being applied to the member 18 and/or to one or more parts of the transmission 4 which are operratively connected with the member 18.

Of course, at least one of the sensors 19a, 19b can be designed to monitor (in addition to or in lieu of monitoring the magnitude of forces) the position and/or the extent of displacement and/or other parameters of the member 18 and/or other parts of the transmission 4 such as can be utilized to either directly ascertain or to calculate or estimate the presence or absence of an intent to shift the transmission into or from a given gear. For example, the circuit 13a can monitor changes of the intensity and/or other parameters of signals from the sensor 19a and/or 19b as a function of time in order to ascertain the presence or absence of an intent to change the condition (selected gar) of the transmission 4.

As already mentioned hereinbefore, the circuit 13a can be continuously or temporarily connected with some or all of the aforementioned sensors and/or additional sensors and/or circuits (such as 50) to process the signals in order to generate appropriate signals for transmission of such signals to the motor 12 of the actuator 13b (or to several actuators), i.e., for a selection of the extent of engagement or disengagement of the automated clutch 3, namely for the selection of operation of the clutch 3 in dependency upon the actual operating pont. A control program in the form of hardware and/or software is implemented in the circuit 13a to properly evaluate and process the incoming signals. Such evaluation or processing can involve a comparison of incoming signals with each other and/or with memorized information (e.g., characteristic fields, characteristic curves, functions and/or others).

It is presently preferred to design the circuit 13a in such a way that the latter embodies or cooperates with one or more of: a torque determining arrangement; a transmission gear selecting or detecting or determining arrangement; an arrangement which monitors and/or ascertains and/or determines the extent of slip between the aforementioned friction linings of the clutch disc 3a and the engine-driven parts 3b, 3d of the clutch 3; an arrangement (note the sensor 60) which transmits signals denoting the temperature of the clutch 3 and/or of the engine 2 and/or of other part(s) of the power train; and/or an arrangement which monitors or determines the operating condition of the engine 2 and/or the motor vehicle 1. Such arrangements can be implemented as hardware or software in the form of control programs. All that counts is to ensure that the circuit 13a can cooperate with the various constituents of the means for transmitting signals to such circuit in order to adequately elect and regulate or control the RPM of the output element of the engine 2 (such RPM is or can be monitored by the sensor 16), the gear of the transmission 4 (monitored by the sensor 19a and/or 19b), the extent of slip of (i.e., the magnitude of the torque being transmitted by) the clutch 3 (determinable, for example, by comparing the signals from the sensors 15 and 17), and the momentary operating condition of the motor vehicle 1 (e.g., the speed determined by the sensor 17). As also mentioned hereinabove, at least one of the sensors 19a, 19b can directly or indirectly monitor the speed, the position and/or other parameters of one or more parts (such as a central shaft or rod) in the case of the transmission 4.

FIG. 1 further shows a load lever (such as a gas pedal) 30 which serves to select the rate of fuel admission into the cylinders of the engine 2. A first sensor 31 transmits to the engine circuit 50 signals which denote the position (such as the extent of depression) of the gas pedal 30, and a second sensor 32 is provided to transmit to the circuit 50 signals denoting whether or not the gas pedal is being actuated or operated (such as depressed). This enables the circuit 50 to transmit to the circuit 13a signals denoting whether or not the engine 2 is idling. The sensor 32 can constitute a digital sensor, e.g., a simple switch which is normally off but is on when the gas pedal 30 is depressed. As shown in FIG. 1, the sensors 31, 32 can be connected to transmit signals directly to the circuit 13a of the control unit 13.

Still further, FIG. 1 shows a brake actuating member 40 and a sensor 41 which monitors the position of the member 40 and transmits to the circuit 13a signals denoting that the vehicle brake and/or the parking brake (i.e., at least one brake) of the motor vehicle 1 is or is not applied. The member 40 can constitute a standard brake pedal or a manually operated handgrip member which is pulled or pushed or otherwise moved to apply or to terminate the application of a parking brake.

The positions of the member 40 can be monitored by a single sensor 41 or by several sensors, e.g., a discrete sensor for each type of braking means provided in the motor vehicle 1. For example, the sensor 41 can constitute a simple digital sensor in the form of a switch which is on when at least one brake is being applied and is off when the vehicle is not braked.

The sensor 41 can include or cooperate with a standard brake light which is on as soon and as long as the brake including or being actuated by the member 40 is being applied. Such brake light can be provided regardless of whether the member 40 is a part of a foot pedal-operated vehicle brake or of a parking brake. It is also possible to employ an analog sensor 41 (e.g., a potentiometer) which indicates that a brake is or is not being applied as well as the extent of application of such brake. One or more brake lights can be provided and controlled by the sensor 41 regardless of the exact nature (digital or analog) of such sensor. The circuit 13a can serve as a means for transmitting signals from the sensor 41 to the engine circuit 50; however, it is also possible to provide a direct signal transmitting connection from the sensor 41 to the engine circuit 50.

The means for starting the engine 2 includes the circuit 50 and can also include a suitable engine activating or starting component which is connected with the control unit 13. For example, the starting component can constitute an ignition key or an ignition switch which can be manipulated by the operator of the motor vehicle 1. It is often preferred to employ a starting component in the form of a key which can be turned and/or otherwise moved by the operator of the motor vehicle 1 to start or to turn off the engine 2 provided that all conditions which warrant or render possible a starting of the motor vehicle are fully met.

The control unit 13 can be designed to regulate or control the motor 12 of the actuator 13b with an open-loop control range and with or without adaption. However, it is equally possible to employ a control unit with a closed-loop controlled system and feedback. Still further, it is possible to rely upon a control or regulating procedure including a control stage with adaption and a regulating stage.

The temperature sensor 60 can transmit to the circuit 13a signals which denote the temperature of the engine 2, the temperature of the clutch 3, the temperature in the region surrounding the clutch, or a combination of such temperatures. For example, if the sensor 60 is set up to monitor the temperature $T_K$ of the atmosphere surrounding the housing 3f of the clutch 3, such signals can be interpreted as being proportional to or representative of signals denoting the temperature in the clutch housing 3f.

Still further, the control unit 13 can be set up to ascertain (based on the slip or the extent of slip of the clutch 3 and on the magnitude of torque being transmitted by the clutch) the energy input of the clutch and, based on the thermal capacities and dissipation of energy (power loss), the clutch temperature $T_K$. In other words, the control unit 13 can be set up to carry out an operation involving the determination of the temperature(s) of one or more regions or constituents of the power train. Reference may be had to commonly owned U.S. patent application Ser. No. 08/592,855 now U.S. Pat. No. 5,823,912.

In order to set the motor vehicle 1 in motion in a controlled and predictable manner, either from standstill or while the vehicle is in the process of creeping or crawling (hereinafter referred to as crawling) at a very low speed (i.e., while the engine is on), the operator merely depresses the gas pedal 30 whereby the unit 13 regulates or controls the automated clutch 3 by way of the actuator 13b. Depression of the gas pedal 30 is detected by the sensor 31 which transmits an appropriate signal to the circuit 13a of the control unit 13. Such signal can denote the velocity and/or the extent of depression of the gas pedal, and the corresponding signal is processed by the circuit 13a; the latter causes the actuator 13b to operate the clutch 3 accordingly. Thus, the gas pedal 30 and the signals generated by the sensor 31 are utilized to regulate, or to contribute to the regulation of, the starting of the motor vehicle 1.

As used in this specification and in the appended claims, the term "crawling" is intended to denote a starting or initial movement of a motor vehicle from zero speed as well as following a rolling movement of the vehicle, i.e., a movement from a lesser speed of a vehicle with wheels which are in the process of rolling along a road surface or another vehicle supporting surface. Otherwise stated, the crawling movement which is initiated and controlled by the power train, and in accordance with the method, of the instant invention is a movement which can be imparted by the output element of a torque transmitting system or torque transmission system (such as the clutch 3) while such system transmits a small or relatively small torque even though the gas pedal or an analogous load selecting member is not or need not be actuated (e.g., depressed) so that the motor vehicle performs a certain (even very slight and very slow) movement as a result of the transmission of torque to one or more wheels.

In the course of a vehicle starting operation, the transmissible RPM and/or the transmissible clutch torque $M_K$ is normally determined on the basis of a preselected function or on the basis of characteristic curves or characteristic fields, for example, in dependency upon the engine RPM. In accordance with a presently preferred embodiment, such dependency upon the engine RPM (or upon other parameters, such as the engine torque) can be realized by resorting to a characteristic field or a characteristic curve.

If the gas pedal 30 is not actuated (while the transmission 4 is in gear, the engine 2 is on, and the brake (40) or brakes is or are not actuated), the control unit 13 causes the clutch 3 to transmit a crawl torque in such a way that the vehicle advances (crawls) at a very low speed. At such time, the control unit 13 causes the actuator 13b to set the clutch in accordance with predetermined functions and one or more preselectable characteristic fields so that the torque being transmitted by the clutch is that torque which is required to generate a desired crawling movement of the motor vehicle.

The circuit 50 determines the torque of the engine 2 and can vary such torque, for example, by selecting the rate of fuel admission, the fuel injection times, the angle of the flap of the throttle valve 15a and/or by varying one or more other parameters. Furthermore, the engine circuit 50 can be connected with one or more other electronic circuits, and the circuit 50 can utilize the input signals to calculate and/or otherwise determine the actual engine torque. For example, a processing of signals denoting the engine RPM (sensor 16), the inclination of the flap of the throttle valve 15a (sensor 15), and/or one or more additional parameters can enable the circuit 50 to calculate the engine torque and to transmit a corresponding signal to the circuit 13a (and other circuits, if any).

Figure 2:
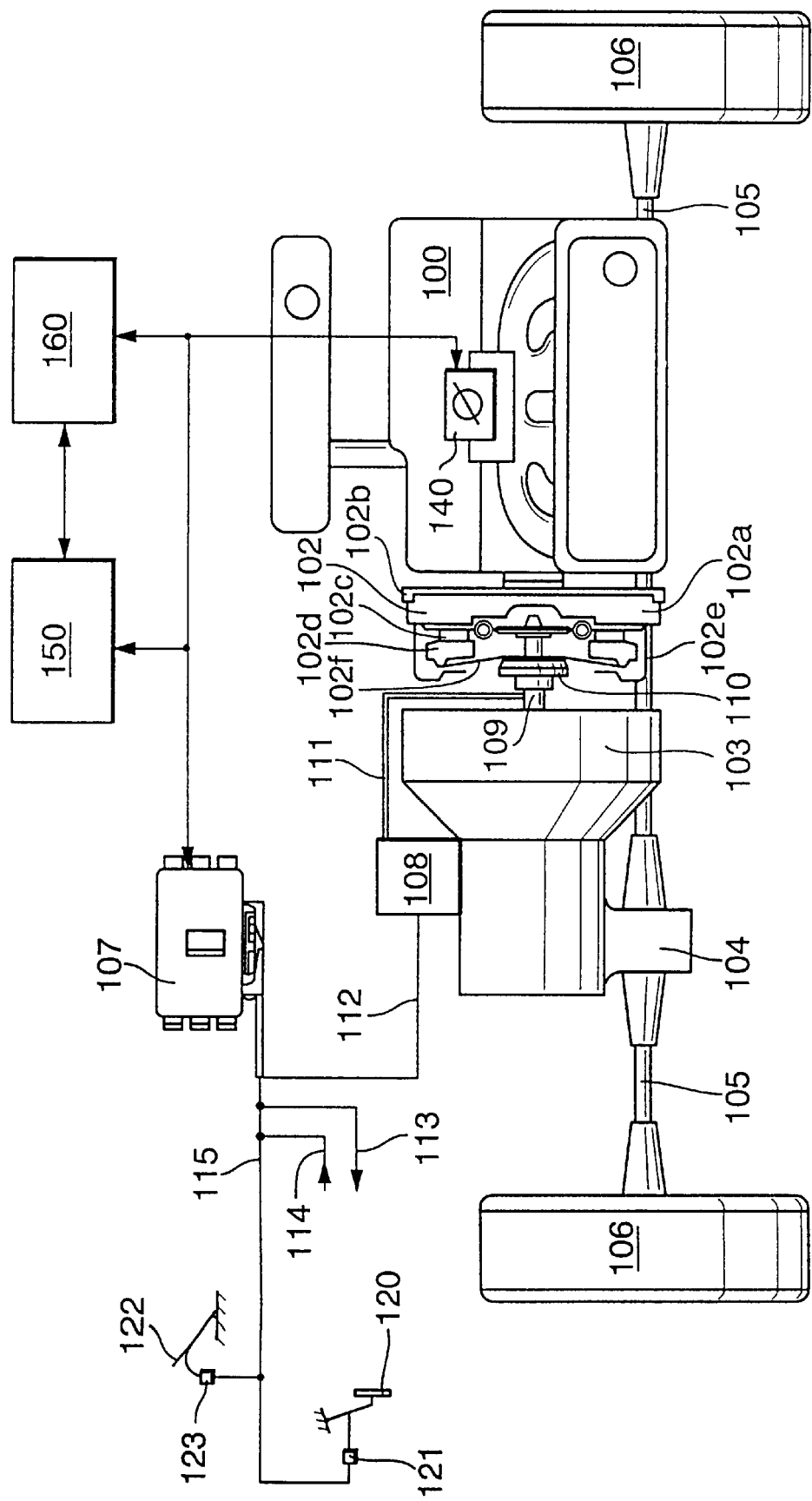
FIG. 2 is a schematic partially plan and partially sectional view of a motor vehicle comprising a modified power train which employs an automated torque transmitting system and an automated transmission.

FIG. 2 shows schematically a modified (second) power train which can be utilized in the motor vehicle 1 in lieu of the power train shown in FIG. 1. The second power train comprises a prime mover (e.g., an internal combustion engine and hereinafter called engine) 100, an automated transmission 103, and an automated torque transmission or torque transmitting system 102 (such as a friction clutch corresponding to the friction clutch 3 of FIG. 1) between a rotary output element of the engine 100 and a rotary input element of the automated transmission 103. The output element of the transmission 103 transmits motion to a differential 104 for the axles 105 of driven wheels 106.

The torque transmission system 102 of FIG. 2 is an automated friction clutch having a rotary input element (flywheel) 102a driven by the output element of the engine 100 and carrying a starter gear 102b. The flywheel 102a cooperates with an axially movable pressure plate 102d to engage the friction linings on a clutch plate or clutch disc 102c which can transmit torque to the input element of the tansmission 103. The rotary housing or cover 102e of the clutch 102 contains a clutch spring 102f (e.g., a standard diaphragm spring) which can be stressed to urge the pressure plate 102d against the adjacent friction lining of the clutch disc 102c when the clutch 102 is at least partly engaged. The clutch disc 102c may be equipped with a standard damper, e.g., a damper of the type disclosed in the aforementioned U.S. Pat. No. 5,450,934.

The means for varying the bias of the clutch spring 102f upon the pressure plate 102d comprises an axially movable bearing 110 in combination with a pressurized fluid-operated central clutch engaging/disengaging component 109. The bearing 110 can tilt the diaphragm spring 102f relative to the housing 102e by way of radially inwardly extending prongs of the diaphragm spring. It is clear that the clutch 102 can be designed as a push-type or as a pull-type clutch.

The means for automatically regulating the extent of engagement (including full engagement and full disengagement) of the clutch 102 comprises an actuator 108 which is operatively connected with the component 109 by a motion transmitting arrangement 111 and receives signals (via conductor means 112) from a control unit 107.

The actuator 108 further comprises one or more electric (or other) motors or the like for automated selection of gears in response to signals from the control unit 107. For example, such motor or motors can transmit motion to one or more internal gear selecting and shifting components of the automated transmission, such as selecting/shifting roller (s) or rod(s) or a control shaft. The arrangement can be such that the shifting into and/or from selected gears must take place in a predetermined sequence or can take place at random.

The control unit 107 receives and/or transmits signals by way of the aforementioned conductor 112 as well as via one or more additional conductors. FIG. 2 shows additional conductors 113, 114, 115 as well as unnumbered conductors leading to an electronic engine circuit 160 and to an electronic circuit 150 for an antislip regulator (ASR) and/or for an automatic braking system (ABS). The conductor 113 leads to a circuit which processes signals transmitted by the circuit of the control unit 107, the conductor 114 connects to a circuit for the processing of incoming signals, and the circuit 115 (e.g., a bus) connects the control unit 107 with a sensor 123 for a load lever (such as a gas pedal) 122 and a sensor 121 for a brake actuating member (e.g., a brake pedal) 120.

The sensor 123 can transmit signals denoting the position or the extent of depression of the gas pedal 122, and the sensor 121 can transmit information denoting the actuation or the absence of actuation of the braking member 120. The means for transmitting signals via conductor 115 can comprise several sensors 121, e.g., a discrete sensor for each of several brakes or braking systems in the motor vehicle emboding the power train of FIG. 2. For example, the vehicle can comprise a standard vehicle brake with a brake pedal 120 as well as a standard parking brake with a manually as well as foot-operated lever, pedal, pusher or a like part, and each such part can be associated with a discrete sensor corresponding to the sensor 121.

For example, the illustrated sensor 121 can constitute a digital sensor, such as a switch, which is designed to transmit (via conductor 115) signals denoting that the brake including the pedal 120 is or is not applied. Such sensor can be associated with a brake light which lights up as soon as the pedal 120 is depressed to indicate that the respective brake or brake system is in use. The same holds true for each additional sensor 121 (if any), i.e., each additional sensor can be set up to actuate a brake light which signals that the respective brake(s) or braking system(s) is(are) in use or not in use.

Alternatively, the sensor 121 can constitute an analog sensor which indicates the extent of application of the brake or braking system including the pedal 120. For example, an analog sensor can include or constitute a potentiometer. Such analog sensor, too, can serve to turn a brake light on or off.

The automated transmission 103 of FIG. 2 can be replaced with a manually shiftable transmission (such as the transmission 4 of FIG. 1). Still further, the automated transmission 103 can be replaced with an automatic transmission such as a stepwise shiftable automatic transmission or an infinitely variable speed transmission corresponding, for example, to that disclosed in the aforementioned U.S. Pat. No. 5,217,412 to Indlekofer et al.

The RPM for starting the motor vehicle embodying the power train of FIG. 2 can be selected as a function of the inclination of the flap of the throttle valve 140, of the torque of the engine 100 and/or the RPM of the engine 100.

The electronic circuit 160 serves to regulate the RPM of the engine 100 and/or the engine torque. Furthermore, the circuit 160 can serve to ascertain the momentary engine torque on the basis of operational parameters of the engine, and signals denoting such torque can be transmitted to the control unit 107. Still further, the engine circuit 160 can transmit signals to and receive signals from the electronic circuit 150 for the aforementioned antiblock system (ABS) and/or the aforementioned antislip regulator (ASR) and/or a traction control.

Figure 3:
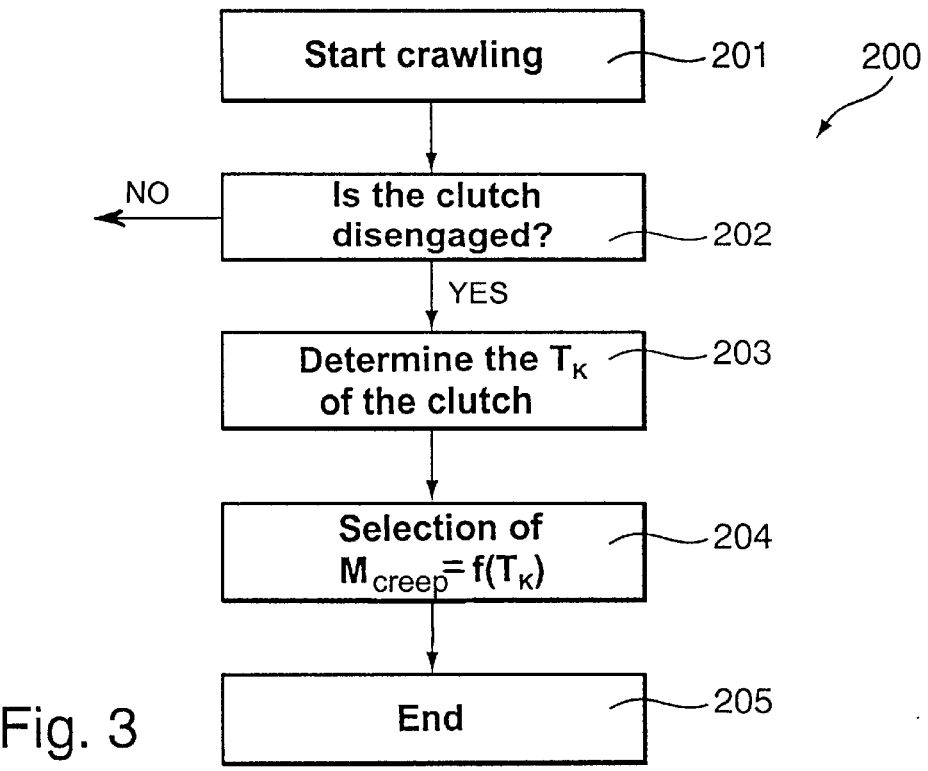
FIG. 3 is a diagram wherein the blocks denote a series of steps of operating the improved power train in accordance with a first embodiment of the novel method.

FIG. 3 shows a block diagram 200 wherein the blocks denote various stages of one mode of initiating and carrying out the novel crawling operation by resorting to the steps of our improved method and by resorting to the structure shown in FIG. 1 or 2.

The block 201 denotes the start of the routine, namely the initializing of a crawling operation. For example, such start can take place in the presence of signals which indicate that the brake(s) is(are) not applied, that the transmission is in gear, that the engine is running, and that the gas pedal is not actuated. Such signals can be transmitted by the sensor 121, the actuator 108, the electronic circuit 160, and the sensor 123 of FIG. 2. The control unit 107 evaluates the signals and causes the clutch 102 to become engaged to an extent which is necessary to initiate a crawling movement of the motor vehicle. The clutch 102 is then at least substantially disengaged (see the block 202 in FIG. 3), i.e., the magnitude of the torque being transmitted by the clutch 102 from the engine 100 to the transmission 103 is at least close to zero. For example, the clutch 102 can be set close to its gripping or engagement point, namely that extent of engagement when the clutch begins to transmit torque to the input element of the transmission 103.

It is often advisable to ensure that the motor vehicle can be caused to crawl when the transmission 103 is shifted into a single selected gear or into one of a small number of selected gears. For example, the arrangement can be such that the motor vehicle is caused to crawl when the transmission 103 is shifted into the first or second forward gear or into reverse gear. If the transmission 103 is shifted into a higher gear, such as third or fourth forward gear, the vehicle is unable to be set into a crawling motion from a complete standstill or from a slow rolling movement. In other words, the torque which the clutch 102 and/or the transmission 103 is capable of transmitting under the just outlined circumstances (transmission in a third or higher forward gear) cannot be utilized to initiate a crawling movement of the motor vehicle. The just described arrangement can be termed a protective or preventive or security system which prevents excessive stressing or loading or charging of the clutch 102.

The block 203 denotes the step of ascertaining the temperature of the clutch 102 (e.g., by resorting to a sensor 60 of the type shown in and described hereinbefore with reference to FIG. 1). The temperature can be ascertained by resorting to sensor (60) and/or by calculating the temperature on the basis of certain parameters, such as the extent of slip of the clutch 3 or 102 (i.e., the difference between the RPM of the input element (such as 3d) and the RPM of the output element (such as 3a) of the clutch as well as the magnitude of the torque which the clutch can transmit, all based on a model of the clutch (including the thermal masses, heat capacities and heat losses).

The block 204 denotes the setting of the clutch 3 or 102 for the transmission of a transmissible torque $M_{creep}$, i.e., an at least slight engagement of the clutch. Such torque $M_{creep}$ is determined as a function of the temperature $T_K$ of the clutch, i.e., $M_{creep}=f(T_K)$. For example, the selected clutch torque $M_{creep}$ can be a linear function of the temperature $T_K$.

The block 205 denotes the termination of the routine.

Figure 3A:
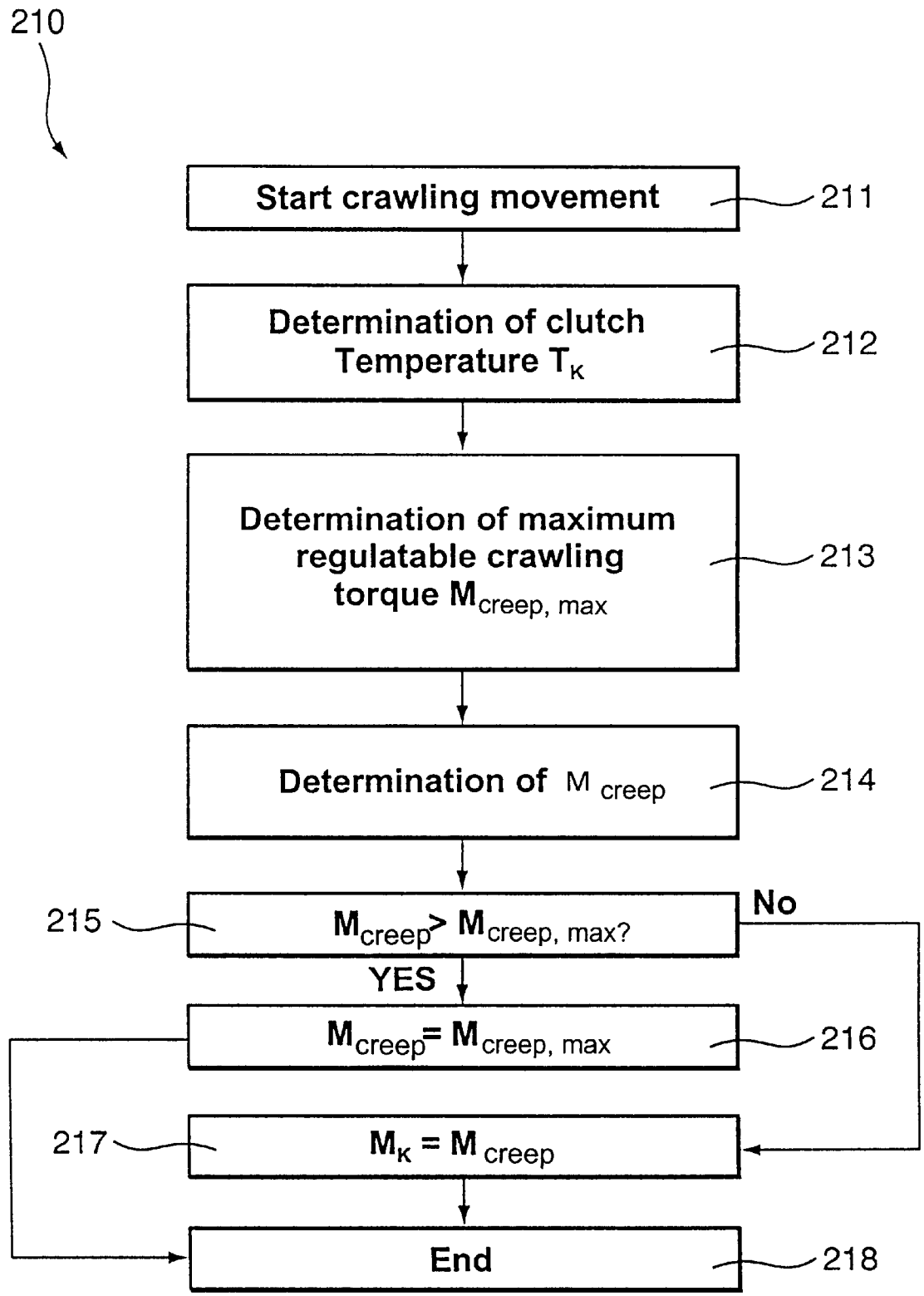
FIG. 3a is a diagram wherein the blocks denote the steps of a modified method.

FIG. 3a shows a diagram 210 wherein the blocks represent various stages of utilization of an embodiment of the improved power train. The block 211 is representative of a start of a crawling movement which can take place if all of the prerequisites for the initiation of such movement are satisfied. The prerequisites include the following: The engine (2 or 100) is running, the transmission (4 or 103) is in gear, the gas pedal (30 or 122) is not depressed, and the brake or brakes (30 or 122) is not or are not applied.

The block 212 is representative of the determination or calculation of the actual temperature $T_K$ of the clutch (3 or 102). For example, information representative of such temperature can be determined or calculated in advance and stored in a memory of the control unit 13 or 107. Thus, the step which is denoted by the block 212 can involve a retrieval of information regarding the temperature $T_K$ from a memory.

The block 213 denotes the determination of a maximum regulatable crawling torque $M_{creep,max}$; such torque is a function of the temperature $T_K$. The dependency of the maximum regulatable crawling torque upon the temperature $T_K$ can be linear or nonlinear. Furthermore, the maximum regulatable torque $M_{creep,max}$ as a function of the temperature $T_K$ can be stored in a memory in the form of a characteristic field, i.e., such memory can be addressed to furnish the value of $M_{creep,max}$ upon prior determination of the temperature $T_K$.

The block 214 is representative of the determination of that crawling torque $M_{creep}$ which is regulatable as a function of the actual operating point or the actual operating conditions. Such torque $M_{creep}$ is or can be a function of preselectable vehicle parameters. However, the crawling torque $M_{creep}$ can also be selected as a constant. The dependency of $M_{creep}$ upon the vehicle parameters can be linear or nonlinear. Still further, information representing $M_{creep}$ as a function of certain vehicle parameters can be stored in a characteristic field so that, once the requisite parameter(s) is or are known, the corresponding $M_{creep}$ can be retrieved from the memory or ascertained on the basis of memorized information.

The block 215 can represent the step of ascertaining, by comparison in the control unit 13 or 107, whether or not the ascertained crawling torque $M_{creep}$ exceeds the maximum regulatable torque $M_{creep,max}$. If the answer is in the negative, the next step (block 217) involves a determination of the crawling torque as before, and such torque is regulated before the routine is terminated at 218. If the answer at 215 is in the affirmative (i.e., id $M_{creep}$ exceeds $M_{creep,max}$) the next step (block 216) involves the selection of $M_{creep,max}$ as the transmissible torque before the routine is terminated at 218.

Figure 4:
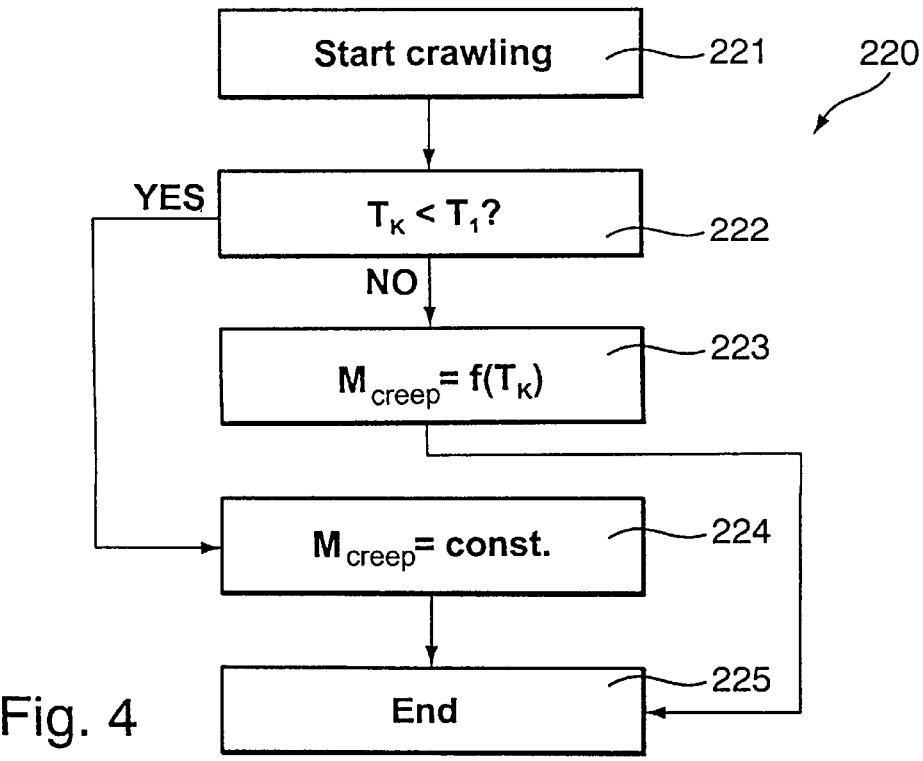
FIG. 4 is a diagram with blocks denoting the steps of a further embodiment of the improved method.

The blocks in the diagram 220 of FIG. 4 denote the progress of a controlling or regulating operation. The crawling is initiated (started) at 221 in the same way and under the same circumstances as already described hereinbefore. The block 222 represents a determination of the clutch temperature $T_K$ and a determination whether the temperature $T_K$ is lower than a limit or threshold value $T_1$. If $T_1 > T_K$, the next step (block 224) involves a regulation of $M_{creep}$ as a preselected constant. However, if $T_K > T_1$, the next step (block 223) involves a regulation of $M_{creep}$ as a function of the temperature ($M_{creep} = f(T_{K1}, \ldots)$) before the routine is terminated at 225.

The procedures represented by the diagrams 200 (FIG. 3) and 220 (FIG. 4) can involve a determination of the maximum permissible crawling torque $M_{creep,max}$ in lieu of the torque $M_{creep}$. In such instance, the torque $M_{creep}$ is determined in a customary way on the basis of preselectable values and, if $M_{creep}$ exceeds $M_{creep,max}$ (which is or which can be a function of the clutch temperature $T_K$), the regulatable crawling torque is limited to match the maximum permissible torque $M_{creep,max}$.

For example, the crawling torque $M_{creep}$ can also depend upon the speed of the motor vehicle, and the actual torque $M_{creep}$ can be regulated as a function of the velocity of the motor vehicle. Still further, the torque $M_{creep}$ can be a function of engine torque or of a difference between engine torques. Still further, the torque $M_{creep}$ can be regulated in a manner as disclosed in the commonly owned U.S. patent application Ser. No. 08/968,707.

If the torque $M_{creep}$ is a function of several parameters, the influence of the temperature $T_K$ is basically a limiting influence in a sense that the dependency of $M_{creep}$ upon $T_K$ prevents the torque $M_{creep}$ from rising at higher temperatures because this would entail a more pronounced wear upon the friction linings of the clutch disc 3a or 102c.

In addition to the regulation of the crawling torque $M_{creep}$, it is also within the purview of the invention to regulate the maximum regulatable torque $M_{creep,max}$ as a function of the temperature. The upper limit of $M_{creep,max}$ can be ascertained in a manner as already described with reference to FIGS. 3 and 4. For example, such regulation can involve a determination and regulation of $M_{creep,max}$ in dependency upon vehicle parameters, and the dependency of such torque upon the temperature can serve as a protective undertaking, for example, by limiting the value of $M_{creep,max}$ as a function of the temperature. If the actual torque $M_{creep}$ is below the maximum regulatable torque, the aforementioned safety undertaking is ineffective. However, if the actual torque $M_{creep}$ exceeds the maximum regulatable value, the protective or safety undertaking comes into play and the actual torque $M_{creep}$ is prevented from rising above $M_{creep,max}$.

Figure 5A:
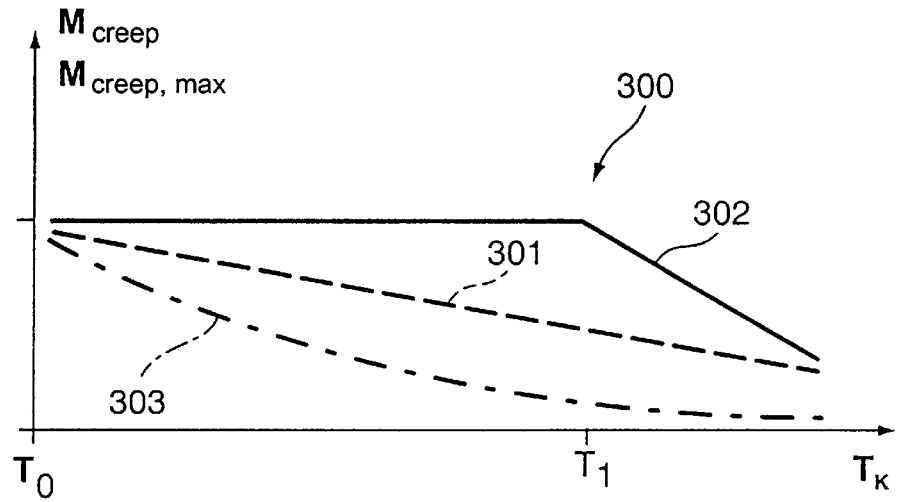
FIG. 5a is a coordinate system wherein the curves indicate the influence of the temperature upon the magnitudes of torque.

The coordinate system 300 of FIG. 5a represents the actual crawling torque $M_{creep}$ or the maximum permissible torque $M_{creep,max}$ as a function of the temperature $T_K$. The curve 301 represents the progress of torque as a function of the temperature, and the torque is dependent upon and regulatable as a function of temperature within the entire temperature range. It will be seen that such torque decreases linearly or substantially linearly as a function of temperature rise. The curve 303 represents a non-linear (e.g., exponential or square) drop of torque. The curve 302 is indicative of a torque which is not affected by temperature changes within the range between $T_0$ and $T_1$ and is below a threshold value; however, $M_{creep}$ decreases substantially linearly when the temperature $T_K$ of the clutch or at the clutch rises above $T_1$.

As can be seen in FIG. 5a, the torque $M_{creep}$ or $M_{creep,max}$ decreases when $T_K > T_1$, but such torque can be regulated essentially independently of temperature changes within the temperature range $T_{K<T1}$. Otherwise stated, basically the threshold value $T_1$ divides the entire useful temperature range of the clutch into two temperature "windows", and the regulation of torques $M_{creep}$ and $M_{creep,max}$ in one of these windows is different from that in the other window.

Figure 5B:
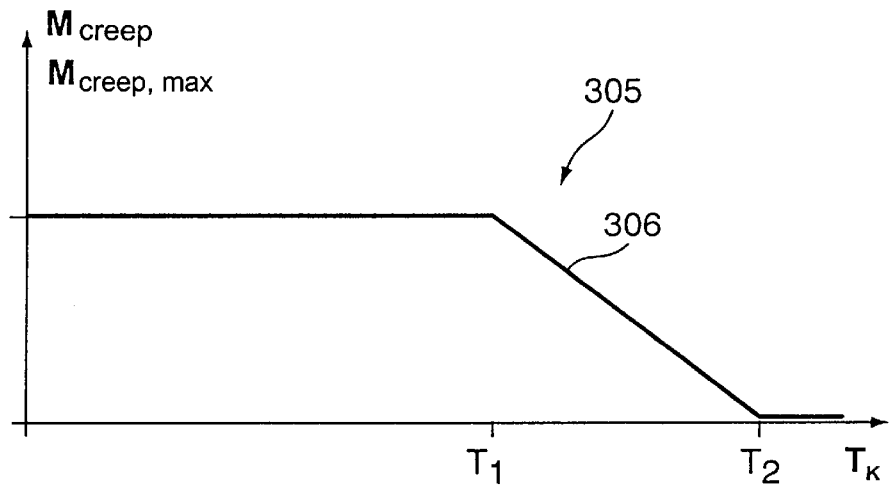
FIG. 5b is a coordinate system wherein the curve again indicates the influence of the temperature upon the magnitude of torque being transmitted by a clutch of the torque transmitting system.

The coordinate system 305 of FIG. 5b contains a curve 306 which denotes the progress of the crawling torques $M_{creep}$ and $M_{creep,max}$ as a function of the clutch temperature $T_K$. The full temperature range embraces two limit or threshold values $T_1$ and $T_2$ which divide the range into three temperature "windows". The first window covers the temperature range below $T_1$, the second window the range between $T_1$ and $T_2$, and the third window the range above $T_2$. The torque is practically or essentially independent of temperature changes within the first window ($T_K < T_1$) and matches or rather closely approximates a fixed preselected value. The torque is basically dependent upon temperature changes within the second window ($T_1 < T_K < T_2$) and decreases from the fixed preselected value to zero or close to zero at least substantially linearly. The torque is basically independent of temperature changes within the third window or range ($T_K > T_2$); such torque can match or matches a preselected value (e.g., zero).

Figure 5C:
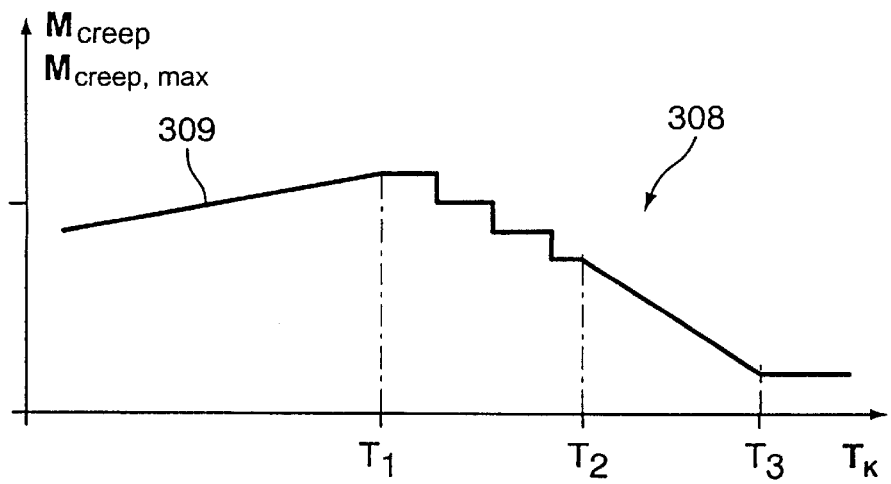
FIG. 5c is a coordinate system wherein the curve again denotes the influence of the temperature upon the clutch torque.

Referring to the coordinate system 308 of FIG. 5c, the progress of torque (such as the actual crawling torque $M_{creep}$ or the maximum torque $M_{creep,max}$) is denoted by the curve 309. The full temperature range (i.e., the range of clutch temperatures $T_K$) includes three threshold values $T_1$, $T_2$ and $T_3$ which divide such range into four temperature "windows", namely $T_K < T_1$, $T_1 < T_{K<T2}$, $T_2 < T_K < T_3$, and $T_K > T_3$. Within the first window ($T_K < T_1$), the torque rises essentially linearly to a preselected value as a function of the rise of temperature. The torque decreases stepwise from the preselected value as a function of temperature rise within the second window ($T_1 < T_K < T_2$), and the torque is again dependent upon temperature changes within the third window ($T_2 < T_K < T_3$), and decreases gradually or essentially gradually to a given value (e.g., close to zero) The torque is basically independent of temperature changes within the fourth window ($T_K > T_3$) and can remain at the aforementioned given value.

Figure 6:
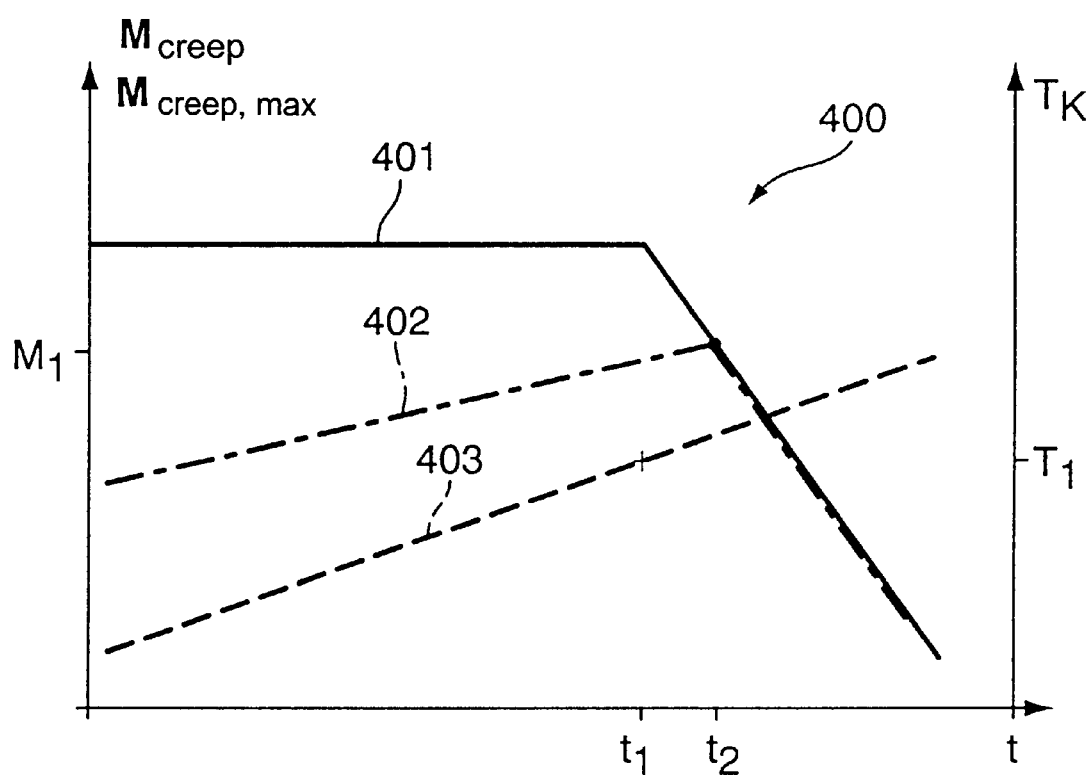
FIG. 6 is a coordinate system wherein the curves denote variations of crawling torque as a function of changes of clutch temperature and also as a function of time.

In the coordinate system 400 of FIG. 6, the curve 402 denotes the variable crawling torque $M_{creep}$ and the curve 401 is indicative of the maximum regulatable crawling torque $M_{creep,max}$. The variations of such torques are represented as a function of the temperature $T_K$ of (or at) the clutch (such as 3 or 102). The clutch temperature $T_K$ is represented as a function of time ($t$).

The curve 403 represents changes of clutch temperature $T_K$ as a function of time $t$; such temperature rises as a function of time because a slip of the clutch involves an energy input which entails a heating of the clutch. At the instant $t_1$, the temperature of the clutch (note the curve 403) rises above a threshold value $T_1$; up to such instant, the maximum regulatable crawling torque $M_{creep,max}$ (curve 401) is essentially constant but it begins to decrease from the instant $t_1$ on.

At the instant $t_2$, the actual torque $M_{creep}$ (curve 402) rises to a value matching the value of the decreasing torque $M_{creep,max}$. From there on, the value of $M_{creep}$ (curve 402) matches the value of $M_{creep,max}$ (curve 401).

Figure 7A:
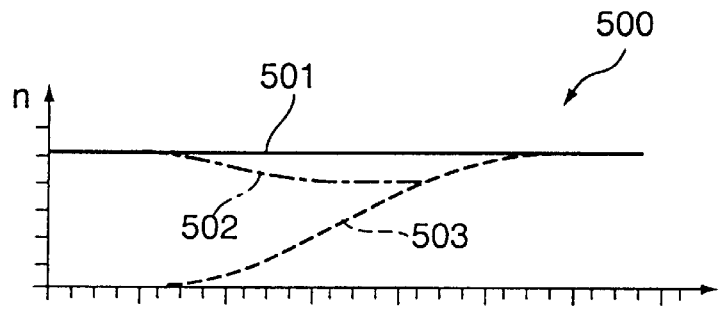
FIG. 7a is a coordinate system wherein the curves indicate changes in rotational speeds of a rotary component of the prime mover and of a rotary component of the transmission as a function of time.

The coordinate system 500 or FIG. 7a includes a curve 502 which denotes the engine RPM ($n_{mot}$), a curve 501 which denotes the idling speed, and a curve 503 which denotes the changes of the transmission RPM ($n_{Get}$)), all as a function of time $t$.

Figure 7B:
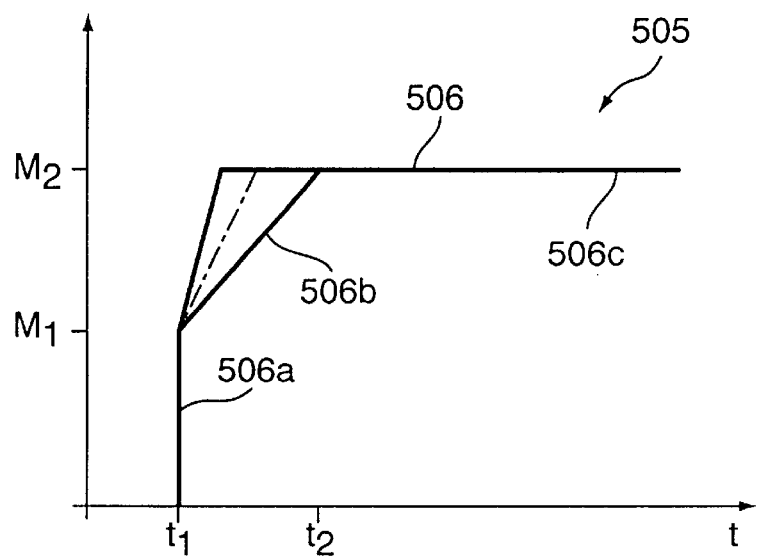
FIG. 7b is a coordinate system wherein the curves indicate the changes of crawling torque as a function of time.

The coordinate system 505 of FIG. 7b includes a curve 506 denoting the changes of crawling torque $M_{creep}$ as a function of time $t$ in the course of a start of crawling movement of a motor vehicle. A crawling movement is initiated or started at the instant $t_1$, for example, as a result of shifting the transmission 4 or 103 into gear while the engine 2 or 100 is running, the gas pedal 30 or 122 is not depressed, and the brake or brakes (40 or 120) is not or are not applied.

A first stage (up to the instant $t_1$) involves a rise of torque $M_{creep}$ to a value $M_1$ by way of a first temperature ramp or function 506a. The next stage (between the instants $t_1$ and $t_2$) involves a rise of $M_{creep}$ up to a value $M_2$ (506c) in accordance with a second temperature ramp or function 506b. The slope of the second ramp 506b can depart from that which is shown in FIG. 7b (three different slopes are actually shown in FIG. 7b). The slope of the second ramp 506b between the instants $t_1$ and $t_2$ is a function of the idling RPM or of a difference between idling RPMs, or of the engine temperature (such as the temperature of coolant (radiator fluid) and/or the temperature of engine oil (lubricant).

The transmission RPM (curve 503 in FIG. 7a) is caused to conform to the engine RPM (curve 502 in FIG. 7a) in the course of the crawling operation. As shown in FIG. 7a, the engine RPM (curve 502) decreases slightly from the instant $t_1$ to thereupon increase back to the initial value during the next following interval.

Figure 7C:
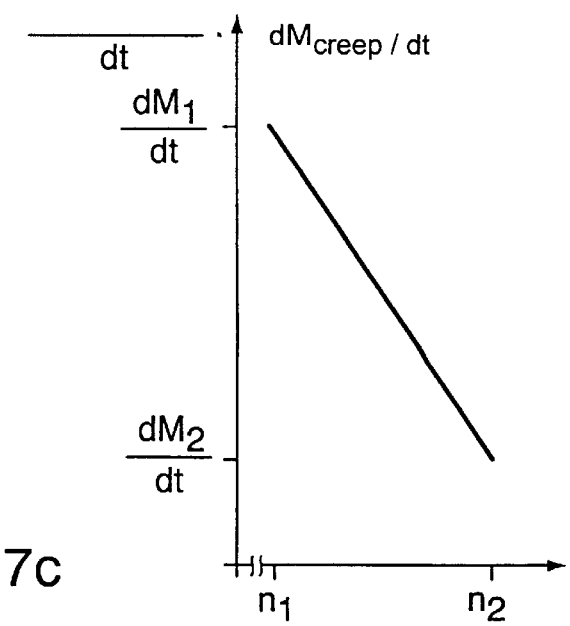
FIG. 7c is a coordinate system wherein the curve represents changes of the buildup of crawling torque as a function of idling RPM of the prime mover of the motor vehicle.

The coordinate system of FIG. 7c shows the rise or buildup of the crawling torque ($dM_{creep}/dt$) as a function of the idling RPM of the engine (curve 501 in FIG. 7a). When the idling RPM $n_{idling}$ of the engine (denoted by the curve 501 of FIG. 7a) is high, the rate $dM/dt$ is less pronounced than at lower idling RPMs of the engine. As shown in FIG. 7c, the idling RPM $n_{idling}$ can decrease substantially linearly but it is also possible to select a different function for the reduction of $n_{idling}$. Furthermore, the slope of the curve denoting the changes of idling RPM of the engine can be a function of certain other values, e.g., a function of changes of differences between RPMs, especially idling RPMs. For example, it might be desirable and advantageous to select the slope of the curve shown in FIG. 7c as a function of changes between the idling RPM in actual (normal) condition of the engine and the idling RPM when the engine is hot. The idling RPM of a hot engine can be well below the actual idling RPM when the engine is cold. It is advisable to consider a start (of the vehicle) during which the engine temperature rises from a low initial temperature or temperature range until it conforms to the engine temperature in normal use of the motor vehicle.

Figure 8:
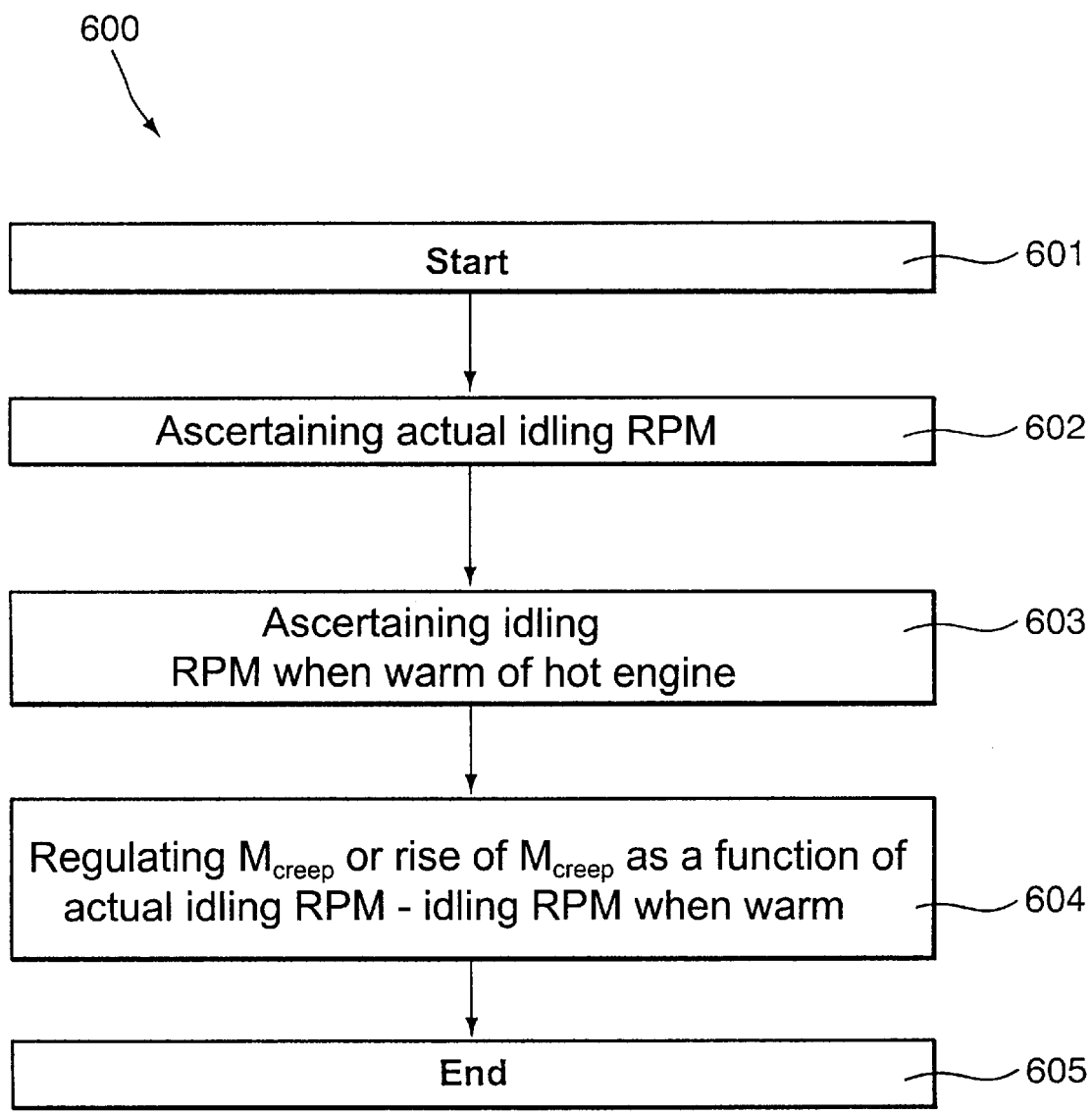
FIG. 8 is a diagram wherein the blocks denote a series of steps in accordance with a further embodiment of the improved method.

In the diagram 600 of FIG. 8, the blocks 601 to 605 denote various steps of a novel regulating operation by resorting to a power train (such as that shown in FIG. 1 or 2) which embodies the present invention. The block 601 denotes the start of a procedure, and the block 602 denotes the step of detecting or otherwise ascertaining the actual idling RPM while the gas pedal is not actuated. The next block 603 denotes a determination (e.g., by addressing a memory) of the idling engine RPM while the engine is hot, i.e., in a state of equilibrium of the engine while the motor vehicle is in use. For example, the rotational speed can be ascertained when the temperature of the coolant (radiator fluid) reaches a predetermined value or when the oil temperature reaches a certain value (such information can be stored in a suitable memory of the control unit and the memory is addressed in a step denoted by the block 603 in the diagram 600 of FIG. 8).

The block 604 denotes a determination of the difference between actual idling RPM and idling RPM when hot. The crawling torque, or an increase of such torque, is determined as a function of the aforementioned difference and is utilized as the torque which can be actually transmitted by the clutch.

For example, the crawling torque can be selected in two or more stages. Thus, a first step or stage can involve a selection of the crawling torque independently of the difference between actual idling RPM and idling RPM when hot, and such selection can include a rise of the torque from zero (or close to zero) to a preselected value. The next (second) step or stage can involve regulation of the crawling torque as a function of the difference between the idling RPMs; alternatively, the rise or growth of such torque can be effected as a function of the difference between the idling RPMs or of the actual (prevailing) RPMs. For example, the second step or stage can involve an increase of the crawling torque from the preselected value to a final value; the rate of increase between such values, as well as the final value of the crawling torque itself, can depend upon the idling RPM. In lieu of a dependency upon the idling RPM, one can also make the crawling torque dependent upon the temperature of the engine or of a parameter which is representative or indicative of such temperature.

Figure 9:
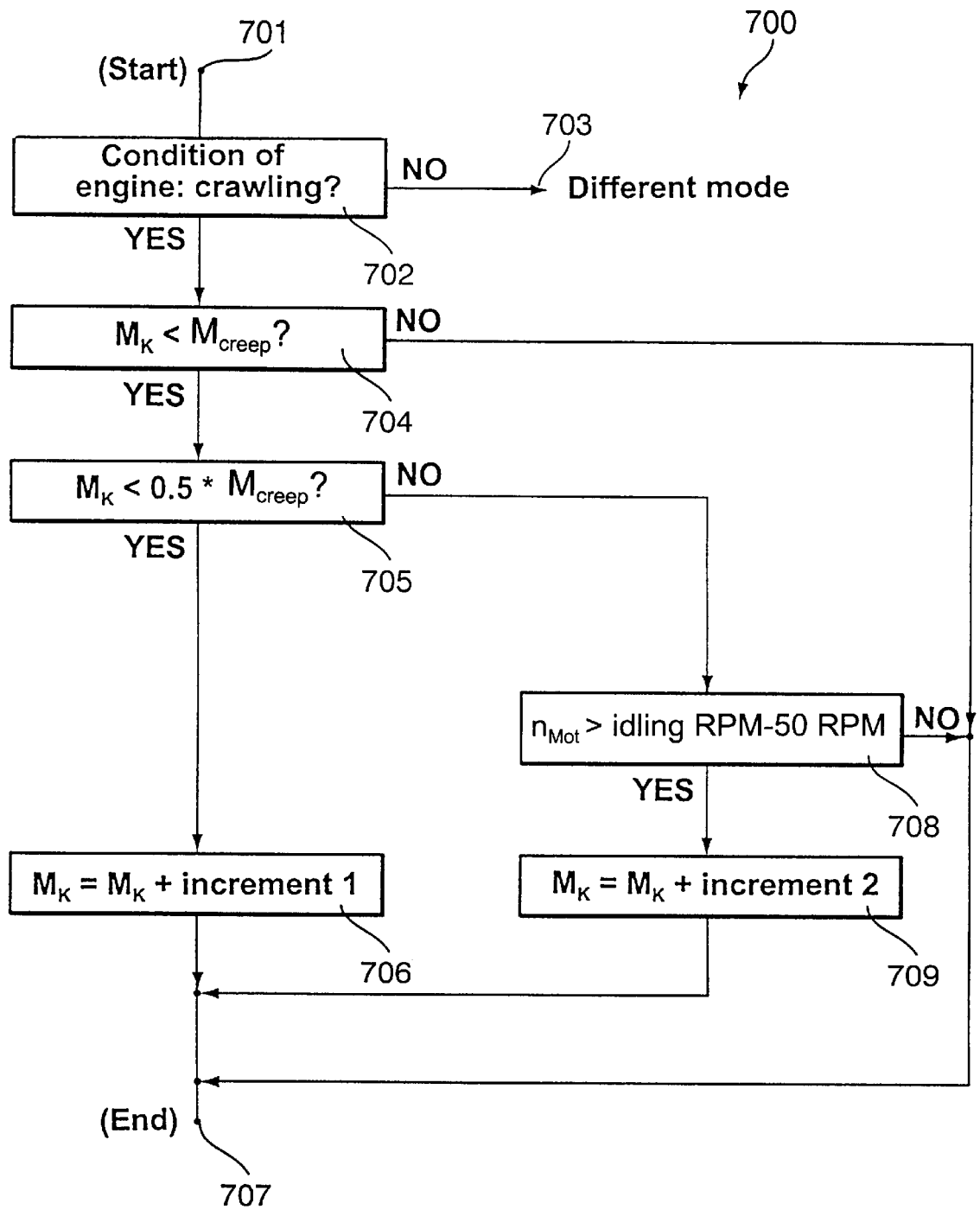
FIG. 9 is a diagram with blocks representing the steps of another embodiment of the improved method which can be practiced by resorting to the power train embodying the instant invention.

FIG. 9 shows a diagram 700 wherein the various blocks denote the utilization or operation of a power train which embodies the invention. The routine is started at 701 provided, of course, that the previously discussed conditions for a crawling movement of the motor vehicle (i.e., the engine is on, the brake or brakes is not or are not applied, etc.) are fully met. The block 702 denotes a determination whether or not the vehicle is in the process of carrying out a crawling movement; for example, such determination can involve the step of ascertaining whether or not all of the prerequisites for the carrying out of a crawling movement are still satisfied. If such is not the case, the next operation (block 703) involves a shift into a different mode. The block 704 is indicative of the step of ascertaining whether or not the actually transmissible clutch torque is less than the crawling torque $M_{creep}$ (i.e., whether or not $M_{creep} > M_K$). If $M_{creep} > M_K$, the next step (block 705) involves a determination whether the actually regulated transmissible clutch torque $M_K$ is less than $M_{creep}$ mutiplied by a factor $\underline{x}$. FIG. 9 shows that the selected factor $\underline{x}$=0.5. If $0.5 * M_{creep} > M_K$, the next step (block 706) involves incrementing MK with the increment 1 before the routine involving the regulation for the then prevailing or existing cycle is terminated at 707.

The routine is also terminated (at 707) if the inquiry at 704 is answered in the negative. If the answer to the inquiry at 705 is "NO", the next step (block 708) involves a determination whether or not the engine RPM $n_{motor}$ is above the idling RPM minus a certain value (in FIG. 9, such value is 50 rpm). The value need not be 50 1/min; for example, it can be selected from a range between 10 1/min and 200 rpm. If the engine RPM exceeds the idling RPM minus the aforementioned value, the transmissible torque $M_K$ is incremented (block 709) by an increment 2 before the routine is terminated at 707. If the engine RPM does not exceed the idling RPM minus the aforementioned value, such as 50 1/min (refer again to the block 708), the step denoted by the block 709 is omitted and the routine is terminated at 707.

Figure 10:
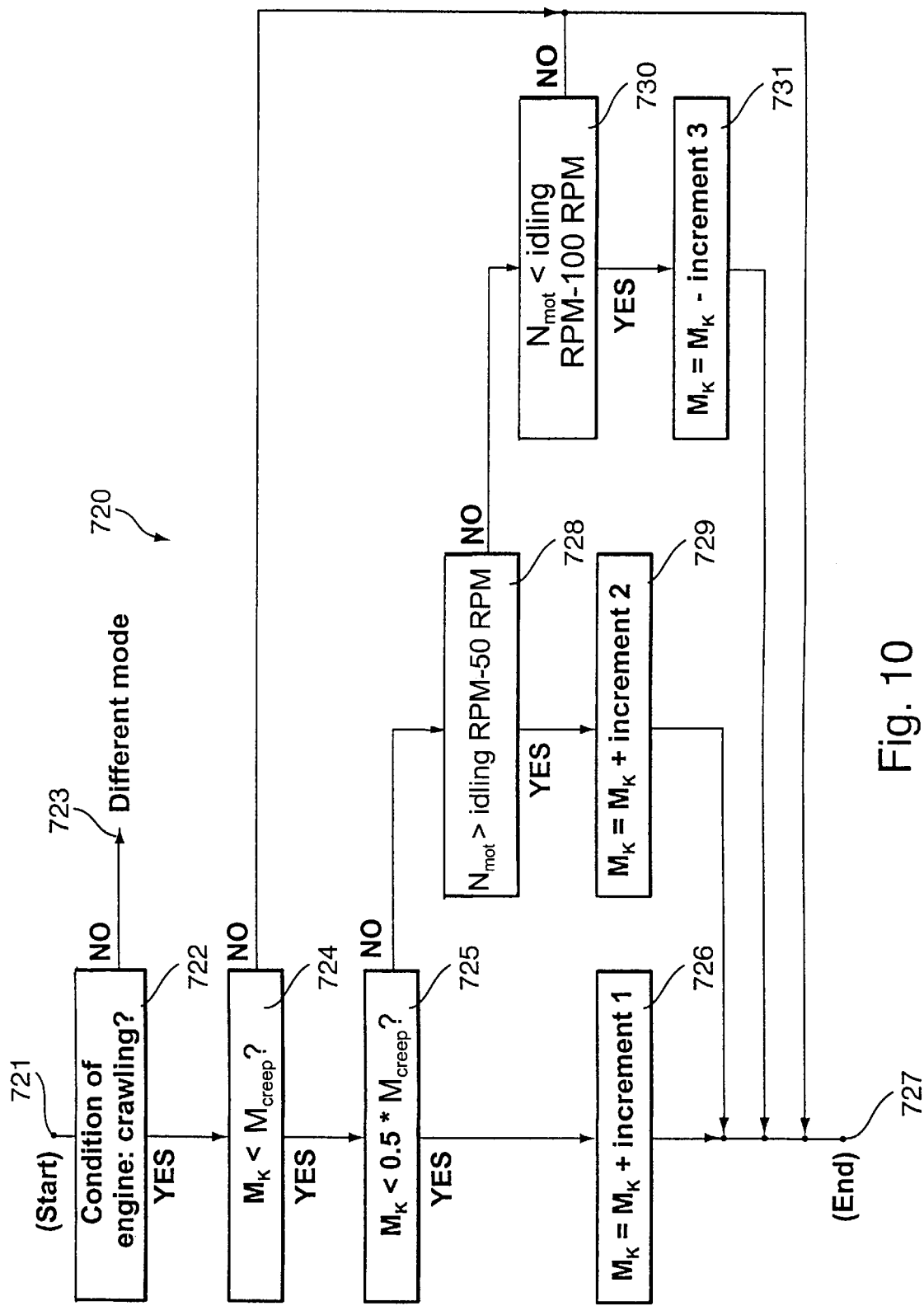
FIG. 10 is a diagram with blocks denoting the steps of a method constituting a modification of the method represented by the blocks of the diagram which is shown in FIG. 9.

Referring to the diagram 720 of FIG. 10, the routine is started at 721 (provided, of course, that the aforediscussed terms for such start are fully met). The block 722 denotes the step of ascertaining whether or not the motor vehicle is in the process of carrying out a crawling movement, i.e., whether or not the aforementioned prerequisites for a crawling movement are still satisfied. If the answer is "NO", the operation is shifted into a different mode (as at 723). If the answer at 722 is "YES", the next operation (at 724) involves a determination whether or not the actually transmissible clutch torque $M_K$ is less than the crawl torque $M_{creep}$ to be regulated, i.e., $M_K < M_{creep}$? If the answer is "YES", the next step (block 725) involves a determination whether or not $M_K < \underline{x} * M_{creep}$ (wherein $\underline{x}$ is a factor which, in FIG. 10, equals 0.5). If the answer is "YES", the next step (block 726) involves an incrementing of the clutch torque $M_K$ with a value increment 1 prior to termination (at 727) of the routine for the existing cycle.

If the answer at 724 is "NO", the routine is also terminated, as at 727. If the answer at 725 is "NO", the next step (block 728) involves a determination whether or not the engine RPM $n_{motor}$ exceeds the idling RPM (LLDRZ) minus a value which, in FIG. 10, equals 50 1/min but can be any other value within the range between 10 1/min and 200 1/min. If the engine RPM exceeds the idling RPM minus the selected value, the transmissible clutch torque $M_K$ is incremented (block 729) by a value increment 2 prior to termination of the routine at 727. If the engine RPM (at 728) does not exceed LLDRZ minus the selected value (which, in FIG. 10, amounts to 50 1/min), the next step (at 730) involves a determination whether the engine RPM $n_{motor}$ is less that LLDRZ minus a second value. If the answer is "YES", the next step (block 731) involves a decrementing (reduction) of $M_K$ by an increment 3 before the routine is terminated at 727. If the answer at 730 is "NO", the routine is terminated at 727.

The result of an operation as represented by the diagram 720 is that the crawling torque is being built up by way of two ramp functions and that, in the course of the crawling movement, the engine RPM is not suppressed to an undesirable extent as a result of an increase of transmissible torque. If the engine RPM drops below a preselectable threshold value, the transmissible clutch torque does not undergo an additional increase and, if the engine RPM drops below a (lower) second threshold value, the transmissible clutch torque is actually decreased. This ensures that the idling speed regulator can increase the engine RPM.

It is preferred to select a value 1 which is different from the value 2; however, there are instances when it is desirable to select a value 1 which equals or at least approximates a second value.

It is further possible to realize a limiting or curtailing of gradients when the motor vehicle is set in motion while the gas pedal is depressed or when the vehicle is caused to crawl while the gas pedal is not depressed; this ensures that the torque which the clutch can transmit (such as the clutch torque) cannot rise in an uncontrolled or unpredictable manner. Such gradient limitation can determine the regulated (controlled) rate of change of clutch torque per unit of time and, if a comparison indicates that the rate of change controlled torque exceeds the maximum permissible value of the gradient $dM_K/dt$, the rise of clutch torque is limited (reduced) so that it does not exceed such gradient.

Figure 11:
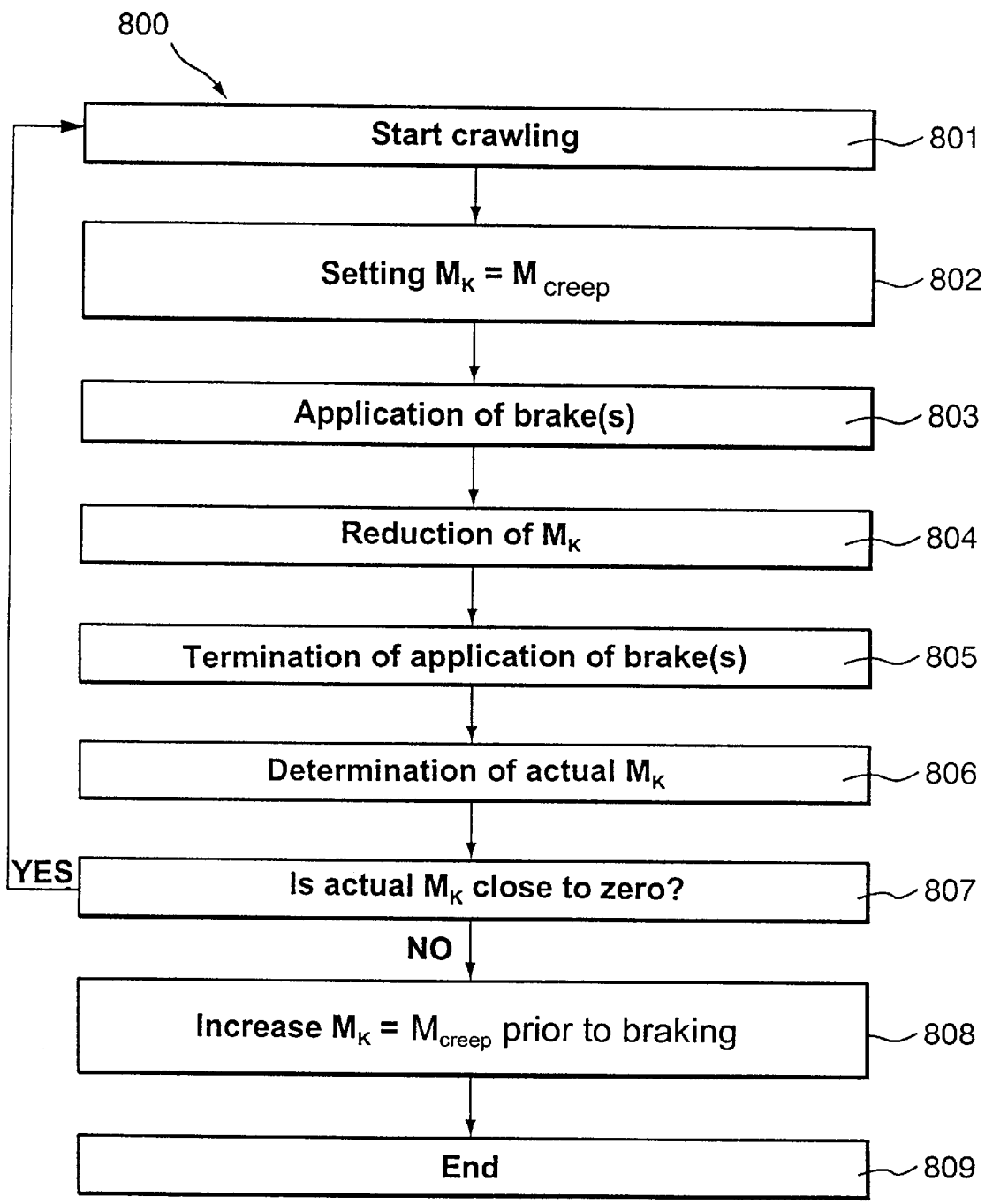
FIG. 11 is a diagram with blocks representing the steps of still another method of operating the improved power train.

The blocks of diagram 800 which is shown in FIG. 11 represent another series of operations in accordance with the instant invention. The start of a crawling movement of the motor vehicle is denoted by the block 801. The block 802 denotes the step of setting the transmissible clutch torque, such as the torque which can be transmitted by the clutch, to match the crawling torque $M_{creep}$.

The block 803 represents the step of the application of a brake by the operator of the motor vehicle, and the block 804 denotes a reduction of the clutch torque which has been set in accordance with the crawling torque, for example, as a function of time. The termination or interruption of the braking operation is denoted by the block 805, and the block 806 denotes the step of determining whether or not the transmissible clutch torque has already been reduced to zero or assumes a value which departs from zero. If the thus ascertained value of transmissible clutch torque equals or closely approximates zero (note the block 807), one can restart the routine at 801, e.g., with a certain delay.

If the step denoted by the block 807 indicates that the actual clutch torque departs from zero, or departs from zero at least by a predetermined value, the next step (block 808) involves an increase of the transmissible clutch torque to a value corresponding to that of the crawling torque prior to the braking step (block 803). It is also possible to select a predetermined crawling torque subsequent to an interrupted braking step and while the crawling torque has not been reduced to zero. Still further, it is possible to select, under the just outlined circumstances, a maximum regulatable clutch torque.

The specification of the present application further incorporates by reference the disclosures of the commonly owned U.S. patent applications Ser. Nos. 08/973,917 (corresponding to German patent application No. 196 16 055), now U.S. Pat. No. 5,989,153, 08/968,707, now U.S. Pat. No. 5,941,792, 08/858,828 now U.S. Pat. No. 6,033, 340, 08/592,855, now U.S. Pat. No. 5,823,912.

The aforementioned summands and/or factors $\underline{a}$ and $\underline{b}$ in the equation $M_{creep}$ or $M_{creep,max} = \underline{a} + \underline{b} * T_K$ can be stored in one or more memories of the control unit 13 or 107 in the form of tables, characteristic fields or the like.

The aforediscussed indirect monitoring of the temperature of the clutch 3 or 102 can take into consideration the thermal capacity of the clutch and/or the thermal capacity of that rotary component (such as the flywheel 3d or 102a) which can be said to form part of the clutch and/or of the prime mover and serves to transmit torque from the prime mover to the clutch. Furthermore, it is possible to take into consideration a cooling rate by heat conduction or convection. Satisfactory modes of carrying out such determinations are disclosed, for example, in the commonly owned U.S. patent application Ser. No. 08/592,855, now U.S. Pat. No. 5,823,912, and in the corresponding German patent application No. 196 02 006.

As also mentioned hereinbefore, an indirect determination of the temperature of the clutch can involve a monitoring of the temperature in the area surrounding the clutch, e.g., of the air in the so-called bell which surrounds the clutch in many types of power trains.

If the mode of operation of the power train is such that the amount of torque transmission by the clutch 3 or 102 is to be reduced in several successive stages, e.g., in two stages as different functions of time, the reduction of such amount during a first stage or interval can involve a reduction of torque from $M_{creep}$ to a value $1/z^*M_{creep}$, and a reduction of torque from $1/z^*M_{creep}$ at least close to zero during the next-following (second) stage or interval. The factor or constant $1/z$ is normally a fraction which indicates the rate at which the torque being transmitted by the clutch 3 or 102 (or another suitable torque transmitting system) is caused to increase or decrease during the aforementioned first interval or stage.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of power trains for use in motor vehicles and method of operating the same and, therefore, such adaptations should and are intended to be comprehended within the meaning and range of equivalence of the appended claims.

What is claimed is:

1. A power train for use in motor vehicles having at least one brake arranged to assume applied and non-applied conditions, said power train comprising:

an energy consuming prime mover having inoperative and operative conditions including an idling condition;

means for supplying energy to said prime mover, said energy suplying means having idle and operative conditions;

a transmission shiftable into and from a plurality of gears;

an automated variable-temperature torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, including means for monitoring the temperature of said system, said control unit being arranged to transmit to said at least one actuator signals which initiate and effect a crawling movement of the vehicle by way of said power train when said transmission is in gear, said prime mover assumes said operative condition in the non-applied condition of said at least one brake, in the inoperative condition of said energy supplying means and while said prime mover is idling to thus induce said system to change, in response to shifting of said transmission into gear, the amount of torque transmission from at least one first value to at least one second value as a function of the monitored temperature of said system.

2. The power train of claim 1, wherein said torque transmitting system comprises at least one of (a) at least one clutch and (b) a hydrokinetic torque converter.

3. The power train of claim 1, wherein said temperature monitoring means comprises at least one first sensor and said signal transmitting means further comprises at least one of (a) a plurality of additional sensors and (b) a plurality of circuits.

4. The power train of claim 3, wherein one of said circuits includes a control circuit for said prime mover.

5. The power train of claim 4, wherein said one circuit forms part of said energy supplying means.

6. The power train of claim 1, wherein said at least one second value of said amount of torque transmission is a maximum value.

7. The power train of claim 1, wherein the motor vehicle is arranged to be driven at a plurality of speeds and said prime mover is arranged to transmit a variable torque, said change of amount of torque transmission from said at least one first value being further a function of at least one of: the speed of the motor vehicle, the magnitude of torque being transmitted by said prime mover, a preselectable value, and at least one vehicle parameter other than speed.

8. The power train of claim 1, wherein said at least one first value of the amount of torque transmission by said system is at least close to zero.

9. The power train of claim 1, wherein said system has engaged and disengaged conditions and an engagement point at which the transmission of torque begins, said at least one first value of the amount of torque transmission by said system corresponding to an amount at said engagement point.

10. The power train of claim 1, wherein said at least one first value of the amount of torque transmission by said system corresponds to a value of torque transmission prior to initiation of said crawling movement of the motor vehicle by way of the power train.

11. The power train of claim 1, wherein said system is arranged to change the amount of torque transmission from said at least one first value to a plurality of second values including a maximum value in accordance with the equation $$M_{creep} \text{ or } M_{creep,max} = \underline{a} + \underline{b}^* T_K$$

wherein $M_{creep}$ is one of said plurality of second values, $M_{creep,max}$ is said maximum value, $\underline{a}$ and $\underline{b}$ are summands and factors, and $T_K$ is the temperature of said system.

12. The power train of claim 1, wherein said system is arranged to change the amount of torque transmission from said at least one first value to a plurality of second values including a maximum value, the temperature of said system being variable within a range of temperatures and said system being arranged to vary said amount of torque transmission within said range of temperatures as at least one function of said temperature in accordance with the equation $$M_{creep} \text{ or } M_{creep,max} = f(T_K, \dots)$$

wherein $M_{creep}$ is one of said plurality of second values, $M_{creep,max}$ is said maximum value, and $T_K$ is the temperature of said system.

13. The power train of claim 12, wherein said at least one function is a linear function.

14. The power train of claim 12, wherein said at least one function is one of non-linear functions including exponential, square and stepped functions.

15. The power train of claim 12, wherein said system is arranged to reduce the second value of said amount of torque transmission in response to a drop of monitored temperature of said system.

16. The power train of claim 12, wherein said system is arranged to reduce the second value of said amount of torque transmission in response to an increase of monitored temperature of said system.

17. The power train of claim 1, wherein said system is arranged to change said amount of torque transmission from said at least one first value to a plurality of second values and the temperature of said system is variable within a range of temperatures including at least one threshold value which divides said range of temperatures into a plurality of narrower ranges, said second values within at least one of said narrower ranges being independent of the monitored temperature of said system.

18. The power train of claim 17, wherein said narrower ranges include a first range and a second range, said first range including including a maximum value and at least one second value within said first range being independent of the monitored temperature of said system.

19. The power train of claim 18, wherein said narrower ranges further include a third range, the second values within said second range being a function of the monitored temperature of said system and the second values within said third range being independent of the monitored temperature of said system.

20. The power train of claim 19, wherein the second values within said third range are at least close to zero.

21. The power train of claim 20, wherein said first range of temperatures is lower than at least one of said second and third ranges.

22. The power train of claim 18, wherein said first range of temperatures is lower than said second range.

23. The power train of claim 18, wherein the amount of torque transmission by said system is arranged to decrease within said second range of temperatures as a function of changes of the monitored temperature.

24. The power train of claim 18, wherein said system is arranged to vary the amount of torque transmission within said first range as a linear function of the monitored temperature of said system.

25. The power train of claim 18, wherein said system is arranged to vary the amount of torque transmission within said first range as a non-linear function of the monitored temperature of said system, said non-linear function being one of a plurality of functions including exponential, square and stepped functions.

26. The power train of claim 1, wherein said means for monitoring the temperature of said system includes at least one sensor.

27. The power train of claim 1, wherein said means for monitoring the temperature of said system includes means for indirectly monitoring said temperature.

28. The power train of claim 27, wherein said system includes an engageable and disengageable friction clutch having rotary driving and driven components which are in frictional sliding engagement with each other in each of a plurality of partially engaged conditions of the clutch with attendant generation of heat, said control unit including means for calculating the temperature of said system on the basis of the quantity of generated heat.

29. The power train of claim 28, wherein said clutch has a thermal capacity which influences the calculation of the temperature of said system.

30. The power train of claim 28, wherein said driving components include at least one flywheel which receives torque from said prime mover.

31. The power train of claim 1, wherein the vehicle is a multi-speed vehicle and the amount of torque transmission by said system is further a function of at least one of a plurality of parameters including the speed of the motor vehicle, the torque of said prime mover while the vehicle is in motion, the idling torque of said prime mover, a difference between the torques being transmitted by said prime mover, the RPM of a rotary component of the prime mover while the vehicle in in motion, the RPM of a rotary component of the prime mover while the prime mover is idling, the RPM of a rotary component of said transmission, the difference between the RPMs of the components of said prime mover and said transmission, and time.

32. The power train of claim 1, wherein said system comprises an engageable and disengageable friction clutch and said amount of torque transmission is dependent upon the extent of engagement of said clutch by said at least one actuator, said amount of torque transmission being arranged to increase in response to increasing engagement and to decrease in response to decreasing engagement of said clutch, at least one of said increase and decrease being arranged to vary as a function of time at least within a portion of the duration of said at least one of said increase and said decrease.

33. The power train of claim 1, wherein said system comprises an engageable and disengageable friction clutch and said amount of torque transmission is dependent upon the extent of engagement of said clutch by said at least one actuator, said amount of torque transmission being arranged to increase in response to increasing engagement and decrease in response to decreasing engagement of said clutch, at least one of said increase and said decrease being arranged to vary within at least two intervals of time in accordance with at least two different functions of time.

34. The power train of claim 33, wherein said amount of torque transmission is arranged to increase from a value at least close to zero to a preselected value within one of said intervals and to depart from said preselected value within another of said intervals.

35. The power train of claim 33, wherein said amount of torque transmission is arranged to decrease from a first predetermined value to a second predetermined value within one of said intervals of time and from said second predetermined value at least close to zero within another of said intervals.

36. The power train of claim 1, wherein the motor vehicle is a multi-speed vehicle and said system comprises an engageable and disengageable friction clutch, said amount of torque transmission being dependent upon the extent of engagement of said clutch by said at least one actuator, said amount of torque transmission being arranged to increase in response to increasing engagement and to decrease in response to decreasing engagement of said clutch, the extent of at least one of said increase and decrease being arranged to vary within at least two intervals of time as a function of at least one of a plurality of parameters including the speed of the motor vehicle, the torque of the prime mover in the idling condition, the RPM of a rotary component of the prime mover in an operative condition other than idling, the RPM of a rotary component of the prime mover during idling, and time.

37. The power train of claim 36, wherein said extent increases in response to an increase of the RPM of said rotary component of said prime mover during idling in accordance with one of linear and non-linear functions of at least one of said plurality of parameters, said nonlinear functions including exponential, square and stepped functions.

38. The power train of claim 36, wherein said extent of at least one of said increase and said decrease increases as a function of the RPM of a rotary component of the prime mover during idling in such a way that the extent increases at a lower rate in response to increasing RPM of said rotary component of the prime mover during idling.

39. The power train of claim 1, wherein said motor vehicle is a multi-speed vehicle and said system comprises an engageable and disengageable friction clutch, said amount of torque transmission being dependent upon the extent of engagement of said clutch by said at least one actuator and said amount of torque transmission being arranged to increase in response to increasing engagement and decrease in response to decreasing engagement of said clutch, the rate of at least one of said increase and said decrease being a function of at least one of a plurality of parameters including the speed of the motor vehicle, the torque of the prime mover in the idling condition, the RPM of a rotary component of the prime mover in an operative condition other than idling, the RPM of a rotary component of the prime mover during idling, and time.

40. The power train of claim 39, wherein said rate of at least one of said increase and said decrease increases as a function of the RPM of a rotary component of the prime mover during idling in such a way that the rate increases at a lower rate in response to increasing RPM of said rotary component of the prime mover during idling.

41. The power train of claim 39, wherein said rate increases in response to an increase of the RPM of said rotary component of said prime mover during idling in accordance with one of linear and non-linear functions of at least one of said plurality of parameters, said nonlinear functions including exponential, square and stepped functions.

42. The power train of claim 39, wherein the rate of at least one of said increase and said decrease increases as a function of variations of said RPM of a component of said prime mover during idling so that the rate of said increase rises in response to a rise of said RPM of a component of said prime mover during idling.

43. The power train of claim 42, wherein said rate of said increase rises as one of linear and non-linear functions of at least one of said plurality of parameters, said non-linear functions including exponential, square and stepped functions.

44. The power train of claim 39, wherein said rate of said increase is regulated to raise the rate of rise of crawling torque as a function of the difference between the actual idling RPM of a component of said prime mover and the idling RPM of such component while the prime mover is heated.

45. The power train of claim 44, wherein said rate of increase is regulated to raise the rate of rise of crawling torque at a lower rate in response to increasing difference between said actual idling RPM and the idling RPM while the prime mover is heated.

46. The power train of claim 45, wherein said raise at said lower rate is effected in accordance with one of linear and non-linear functions of at least one of said plurality of parameters, said non-linear functions including exponential, square and stepped functions.

47. The power train of claim 45, wherein said rate of rise of crawling torque is inversely proportional to said difference between said actual RPM and the idling RPM while the prime mover is heated.

48. A power train for use in a variable-speed motor vehicle having at least one brake arranged to assume applied and non-applied conditions, said power train comprising:

an energy consuming prime mover arranged to transmit torques of different magnitudes and having inoperative and operative conditions including an idling condition;

means for supplying energy to said prime mover, said energy supplying means having idle and operative conditions;

a transmission shiftable into and from a plurality of gears;

an automated variable-temperature torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit including means for monitoring the temperature of said system, means for monitoring a first parameter including the speed of the motor vehicle, means for monitoring the magnitude of the torque being transmitted by said prime mover, and means for monitoring at least one further parameter of the motor vehicle, said control unit being arranged to transmit to said at least one actuator signals which initiate and effect a crawling movement of the motor vehicle by way of said power train when said transmission is in gear, said prime mover assumes said operative condition in the non-applied condition of said at least one brake, in the inoperative condition of said energy supplying means and while said prime mover is idling to thus induce said system to change the amount of torque transmission from at least one first value to at least one second value as a function of at least one of (a) at least one of said monitored parameters, (b) said monitored magnitude of torque being transmitted by said prime mover, and (c) a preselectable value, said amount of torque transmission by said system including a maximum amount which is a function of the monitored temperature of said system.

49. A power train for use in a motor vehicle having at least one brake arranged to assume applied and non-applied conditions, said power train comprising:

an energy consuming variable-RPM prime mover having inoperative and operative conditions including an idling condition;

means for supplying energy to said prime mover, said energy supplying means having idle and operative conditions;

a transmission shiftable into and from a plurality of gears;

an automated torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the motor vehicle by way of said power train when said transmission is in gear, said prime mover assumes said operative condition in the non-applied condition of said at least one brake, in the inoperative condition of said energy supplying means and while said prime mover is idling to thus induce said system to change the amount of torque transmission from at least one first value to at least one second value, said signal transmitting means including means for monitoring the RPM of said prime mover at least while the motor vehicle is crawling and said control unit being arranged to increase said amount of transmission while the RPM of said prime mover is above a predetermined threshold value.

50. A power train for use in a motor vehicle having at least one brake arranged to assume applied and non-applied conditions, said power train comprising:

an energy consuming variable-RPM prime mover having inoperative and operative conditions including an idling condition;

means for supplying energy to said prime mover, said energy supplying means having idle and operative conditions;

a transmission shiftable into and from a plurality of gears;

an automated torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the vehicle by way of said power train when said transmission is in gear, said prime mover assumes said operative condition in the non-applied condition of said at least one brake, in the inoperative condition of said energy supplying means and while said prime mover is idling to thus induce said system to change the amount of torque transmission from at least one first value to at least one second value, said signal transmitting means comprising means for monitoring the RPM of said amount of torque transmission while the motor vehicle is crawling and said control unit being arranged to increase said at least one first value while the RPM of said prime mover is above a first threshold value and to at least slightly reduce the rate of torque transmission when the RPM of said prime mover decreases below a second threshold value.

51. The power train of claim 50, wherein the RPM of said prime mover in said idling condition of said prime mover exceeds said first threshold value by a predetermined amount.

52. The power train of claim 51, wherein said first threshold value exceeds said second threshold value.

53. The power train of claim 50, wherein said control unit is arranged to increase the amount of torque transmission by said system in response to a change of the RPM of said prime mover from said second threshold value to a third threshold value.

54. The power train of claim 53, wherein the RPM of said prime mover in said idling condition of the prime mover exceeds said third threshold value by a predetermined amount and said third threshold value exceeds said second threshold value.

55. The power train of claim 53, wherein said third threshold value at least approximates said first threshold value.

56. A power train for use in a motor vehicle, said power train comprising:

an energy consuming prime mover having inoperative and operative conditions including an idling condition;

means for supplying energy to said prime mover, said energy supplying means having idle and operative conditions;

a transmission shiftable into and from a plurality of gears;

an automated torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the vehicle by way of said power train when said transmission is in gear, said prime mover assumes said operative condition in the non-applied condition of said at least one brake, in the inoperative condition of said energy supplying means and while said prime mover is idling to thus induce said system to change, in response to shifting of said transmission into gear, the amount of torque transmission from at least one first value to at least one second value within a predetermined period of time, wherein said second value corresponds to an amount of torque transmission at which the motor vehicle begins to carry out said crawling movement.

57. A power train for use in a motor vehicle having at least one brake arranged to assume applied and non-applied conditions, said power train comprising:

an energy consuming prime mover having inoperative and operative conditions;

means for supplying energy to said prime mover, said energy supplying means having idle and operative conditions;

a transmission shiftable into and from a plurality of gears;

an automated torque transmission system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the vehicle by way of said power train when said transmission is in gear, said prime mover assumes said operative condition in the non-applied condition of said at least one brake, in the inoperative condition of said energy supplying means and while said prime mover is idling to thus induce said system to change, in response to shifting of said transmission into gear, the amount of torque transmission from at least one first value to at least one second value at which the motor vehicle proceeds to carry out said crawling movement until the application of said at least one brake which entails a reduction of said at least one second value as a function of time, said control unit being further arranged to set said amount at a predetermined third value in response to a termination of the application of said at least one brake prior to a reduction of said amount all the way to zero.

58. A power train for use in a motor vehicle having at least one brake arranged to assume applied and non-applied conditions, said power train comprising:

an energy consuming prime mover having inoperative and operative conditions;

means for supplying energy to said prime mover, said energy supplying means having idle and operative conditions;

a transmission shiftable into and from a plurality of gears;

an automated torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the vehicle, by way of said power train when said transmission is in gear, said prime mover assumes said operative condition in the non-applied condition of said at least one brake and in the inoperative condition of said energy supplying means to thus induce said system to change, in response to shifting of said transmission into gear, the amount of torque transmission from at least one first value to at least one second value at which the motor vehicle proceeds to carry out said crawling movement until the application of said at least one brake which entails a reduction of said amount of torque transmission from said at least one second value as a function of time, said control unit being further arranged to set said amount back to said second value in response to a termination of the application of said at least one brake prior to a reduction of said amount of torque transmission to zero.

59. A power train for use in a motor vehicle having at least one brake arranged to assume applied and non-applied conditions, said power train comprising:

an energy consuming prime mover having inoperative and operative conditions;

means for supplying energy to said prime mover, said energy supplying means having idle and operative conditions;

a transmission shiftable into and from a plurality of gears;

an automated torque transmitting system connected with at least one of said prime mover and said transmission; and means for operating said system, including a signal receiving, processing and transmitting control unit, at least one actuator arranged to select the amount of torque transmission by said system in response to signals from said control unit, and means for transmitting signals to said control unit, said control unit being arranged to transmit to said at least one actuator signals which effect a crawling movement of the vehicle by way of said power train when said transmission is in gear, said prime mover assumes said operative condition in the non-applied condition of said at least one brake and in the inoperative condition of said energy supplying means to thus induce said system to change, in response to shifting of said transmission into gear, the amount of torque transmission from at least one first value to at least one second value at which the motor vehicle proceeds to carry out said crawling movement until the application of said at least one brake which entails a reduction of said at least one second value toward zero, said control unit being further arranged to change said amount to a maximum permissible third value in response to a termination of the application of said at least one brake prior to reduction of said at least one second value all the way to zero.

60. The power train of claim 59, wherein said third value exceeds said at least one second value.

61. A method of operating a power train in a motor vehicle having at least one brake arranged to assume applied and non-applied conditions, the power train comprising an energy consuming prime mover having inoperative and operative conditions including an idling condition, means for supplying energy to the prime mover, said energy supplying means having idle and operative conditions, a transmission shiftable into and from a plurality of gears, an automated variable-temperature torque transitting system connected with at least one of said prime mover and said transmission, and means for operating said system including a signal receiving, processing and transmitting control unit, at least one actuator arranged to select the amount of torque transmission by said system in response to signals from the control unit, and means for transmitting signals to the control unit including means for monitoring the temperature of said system, comprising the steps of:

shifting the transmission in gear;

causing the prime mover to assume the operative condition;

maintaining the at least one brake in the non-applied condition;

causing the energy supplying means to assume the inoperative condition; and as a result of shifting the transmission in gear, causing the control unit to transmit to the at least one actuator signals which effect a crawling movement of the motor vehicle by way of the power train to thus induce said system to change the amount of torque transmission from at least one first value to at least one second value as a function of monitored temperature of said system.

* * * * *